United States Patent
Chen et al.

(10) Patent No.: US 12,537,895 B2
(45) Date of Patent: Jan. 27, 2026

(54) INFORMATION DISPLAY METHOD AND ELECTRONIC DEVICE

(71) Applicant: Honor Device Co., Ltd., Shenzhen (CN)

(72) Inventors: Jiazi Chen, Shenzhen (CN); Yiyan Ding, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 347 days.

(21) Appl. No.: 18/277,825

(22) PCT Filed: May 16, 2022

(86) PCT No.: PCT/CN2022/092916
§ 371 (c)(1),
(2) Date: Aug. 18, 2023

(87) PCT Pub. No.: WO2023/016012
PCT Pub. Date: Feb. 16, 2023

(65) Prior Publication Data
US 2024/0137438 A1    Apr. 25, 2024
US 2024/0236227 A9    Jul. 11, 2024

(30) Foreign Application Priority Data

Aug. 12, 2021 (CN) .......................... 202110927115.5

(51) Int. Cl.
*H04M 1/72451* (2021.01)
*G06Q 50/40* (2024.01)
(Continued)

(52) U.S. Cl.
CPC ........ *H04M 1/72451* (2021.01); *G06Q 50/40* (2024.01); *H04M 1/72472* (2021.01); *H04M 1/72484* (2021.01); *G06F 9/451* (2018.02)

(58) Field of Classification Search
CPC ......... H04M 1/72451; H04M 1/72472; H04M 1/72484; H04M 1/72457; H04M 2201/42;
(Continued)

(56) References Cited

U.S. PATENT DOCUMENTS 11,314,923 B2    4/2022 Pang
2013/0339068 A1*  12/2013 Lee .......................... G07C 9/28
                                                                705/5
(Continued)

FOREIGN PATENT DOCUMENTS

CN          1429364 A      7/2003
CN        105554280 A      5/2016
(Continued)

*Primary Examiner* — Farid Seyedvosoghi
(74) *Attorney, Agent, or Firm* — Leydig, Voit & Mayer, Ltd.

(57) ABSTRACT

This application provides an information display method. A method includes: displaying, by an electronic device, a first user interface, and when the electronic device meets a first preset condition, displaying, by the electronic device, a display window on the first user interface, where the display window is used for displaying first reminder information corresponding to the first preset condition, and the first preset condition includes at least one of the following: a location of the electronic device is within a first preset area range, system time of the electronic device is within a first preset time range, or the electronic device obtains a first preset message; and stopping, by the electronic device, displaying the display window after duration in which the electronic device displays the display window reaches first duration, where the first duration corresponds to the first reminder information.

17 Claims, 24 Drawing Sheets

(51) Int. Cl.
*H04M 1/72472* (2021.01)
*H04M 1/72484* (2021.01)
*G06F 9/451* (2018.01)

(58) Field of Classification Search
CPC . H04M 2250/10; G06Q 50/40; G06Q 10/109;
G06Q 10/1093; G06Q 30/016; G06F
9/451; G06F 3/0482; G06F 16/9537;
G06F 16/9538; H04N 21/2146; H04N
21/4583
See application file for complete search history.

(56) References Cited

U.S. PATENT DOCUMENTS

| | | |
|---|---|---|
| 2018/0041623 A1 | 2/2018 | Song et al. |
| 2019/0213558 A1 | 7/2019 | Hsu |
| 2020/0409520 A1 | 12/2020 | Ni et al. |
| 2022/0147228 A1 | 5/2022 | Yi et al. |
| 2023/0152950 A1 | 5/2023 | Xue |

FOREIGN PATENT DOCUMENTS

| | | | | |
|---|---|---|---|---|
| CN | 106909365 A | | 6/2017 | |
| CN | 109947322 A | * | 6/2019 | ......... G06Q 10/1093 |
| CN | 110471639 A | | 11/2019 | |
| CN | 110889676 A | | 3/2020 | |
| CN | 111859944 A | | 10/2020 | |
| CN | 111884822 A | | 11/2020 | |
| CN | 112148412 A | | 12/2020 | |
| CN | 113791850 A | | 12/2021 | |
| IN | 110471591 A | | 11/2019 | |
| WO | WO-0169387 A2 | * | 9/2001 | ........... G06Q 10/109 |

* cited by examiner

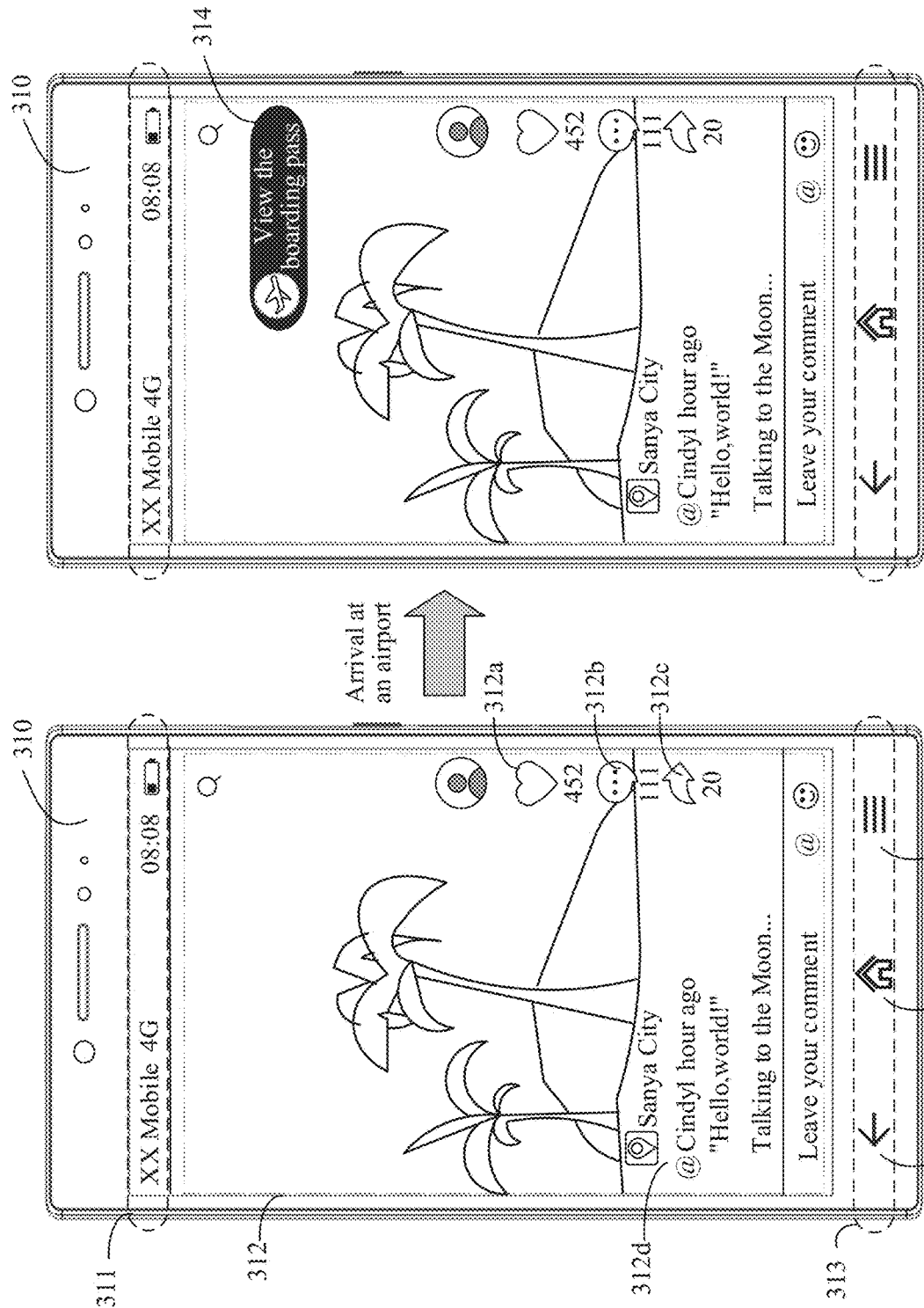

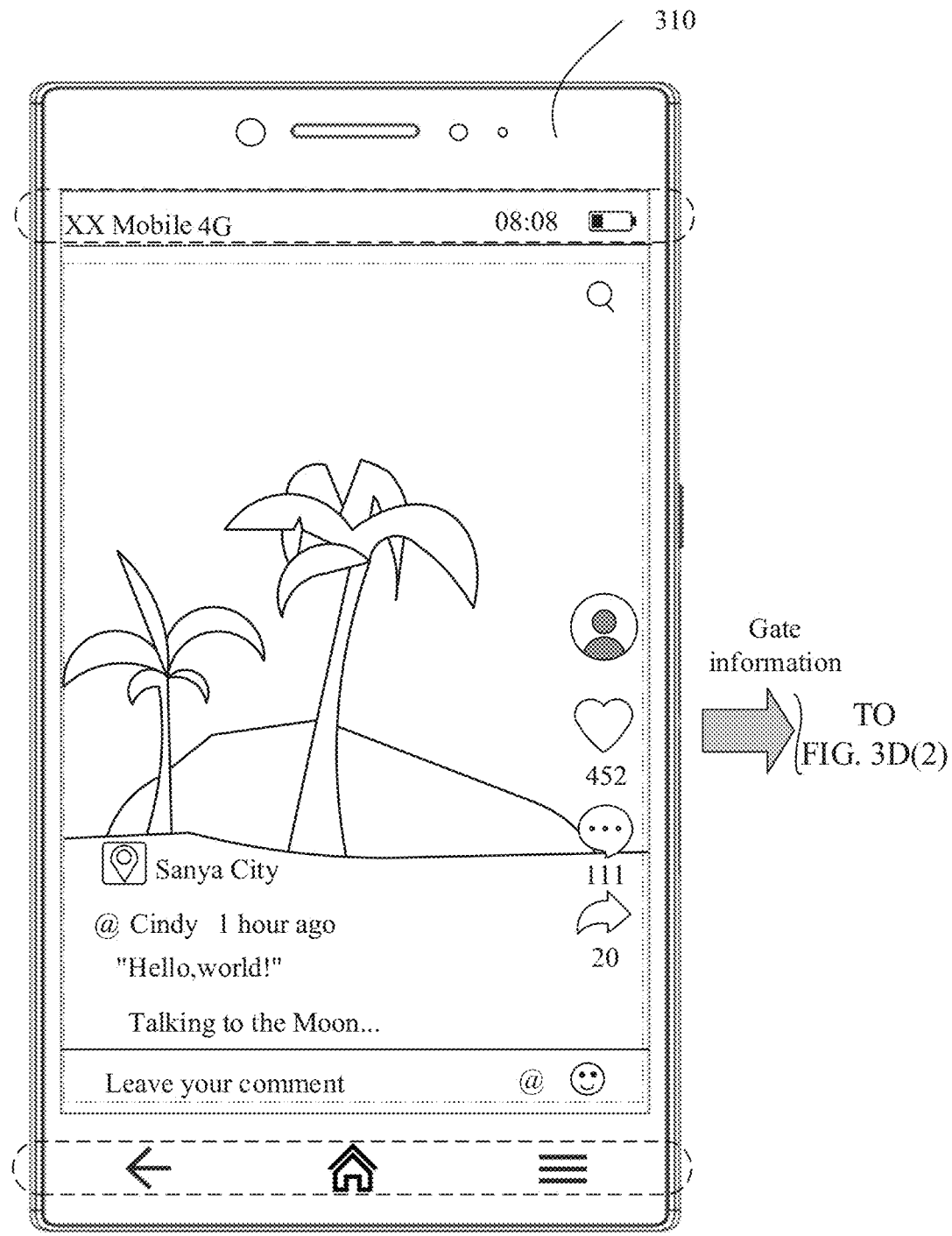
FIG. 3D(1)

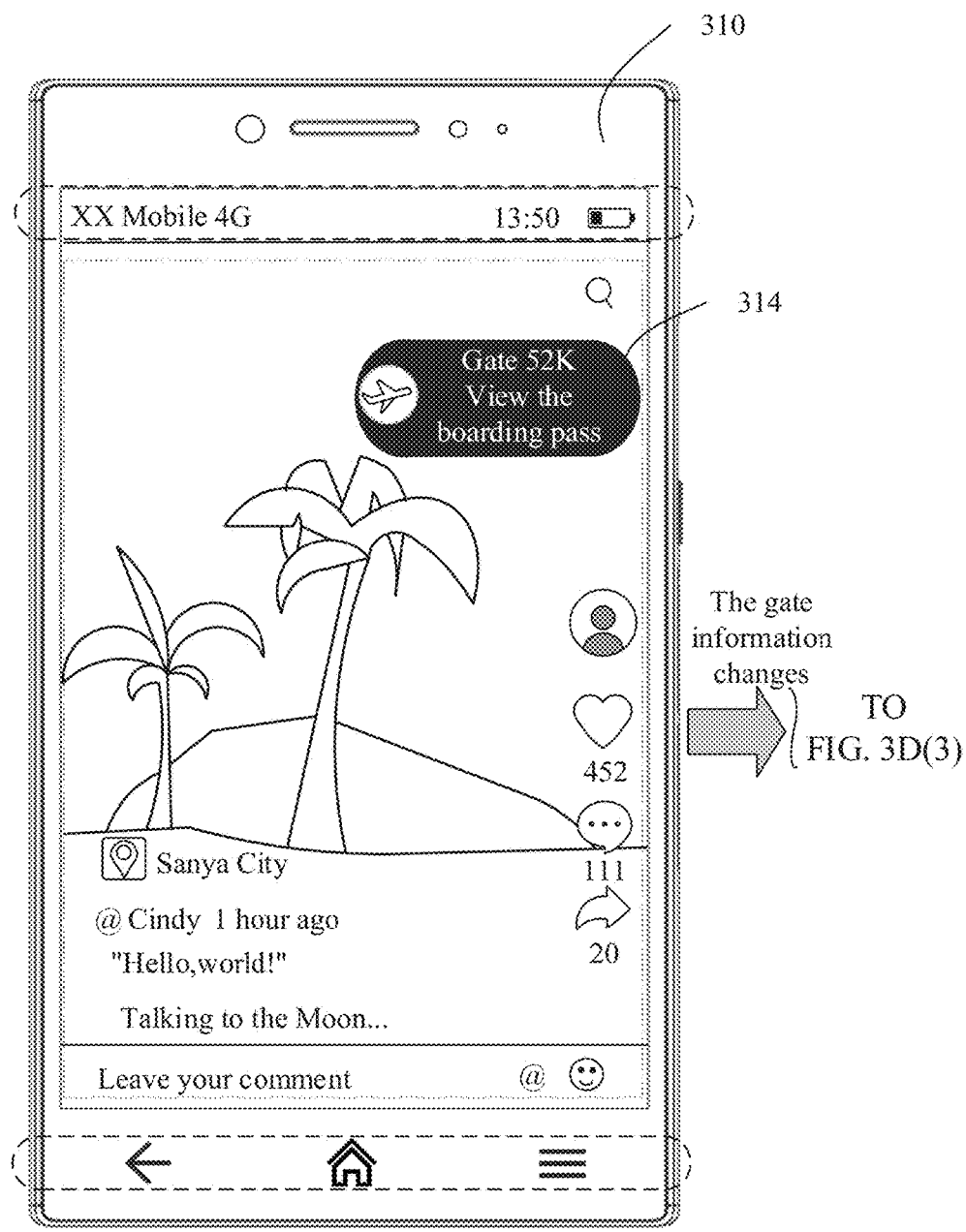
FIG. 3D(2)

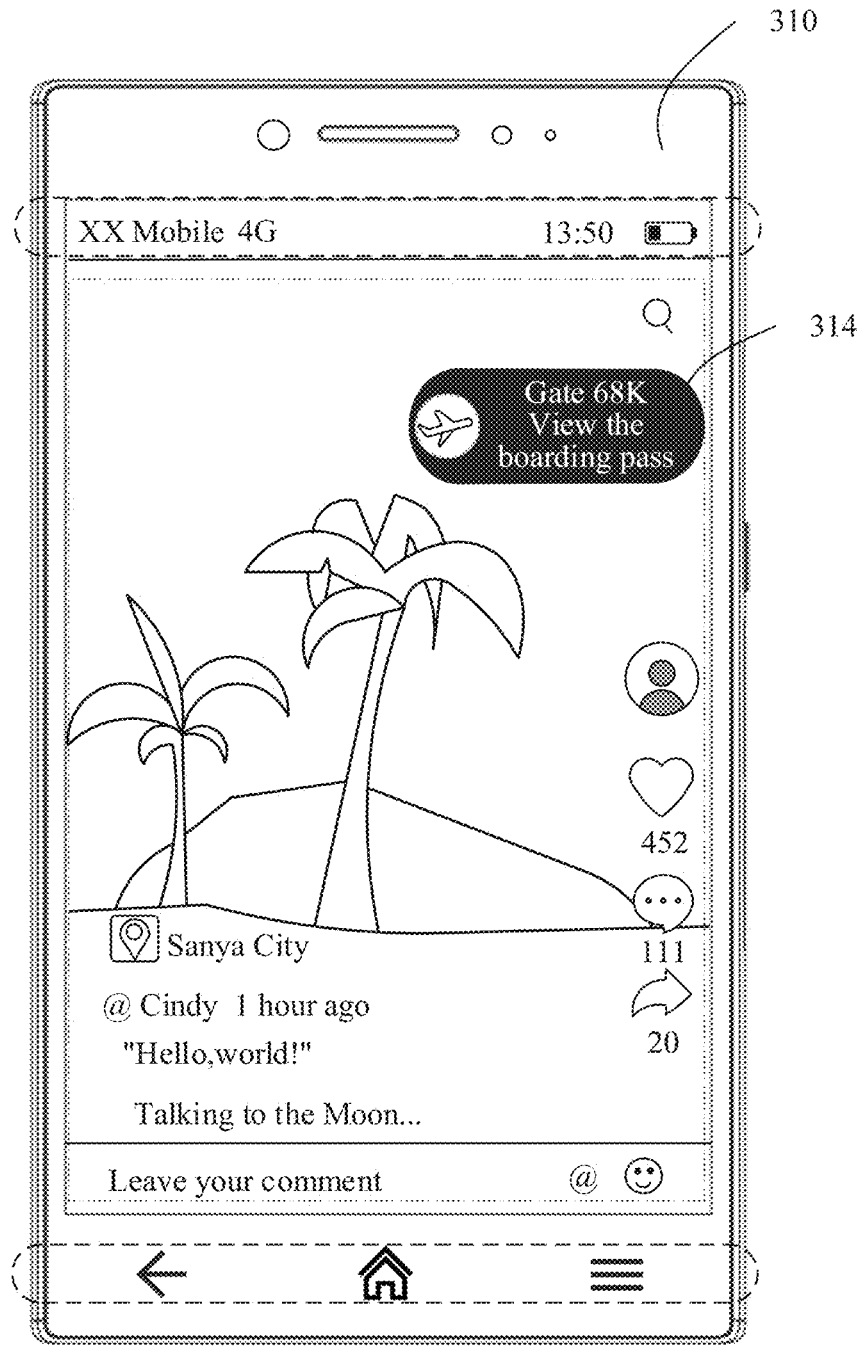
FIG. 3D(3)

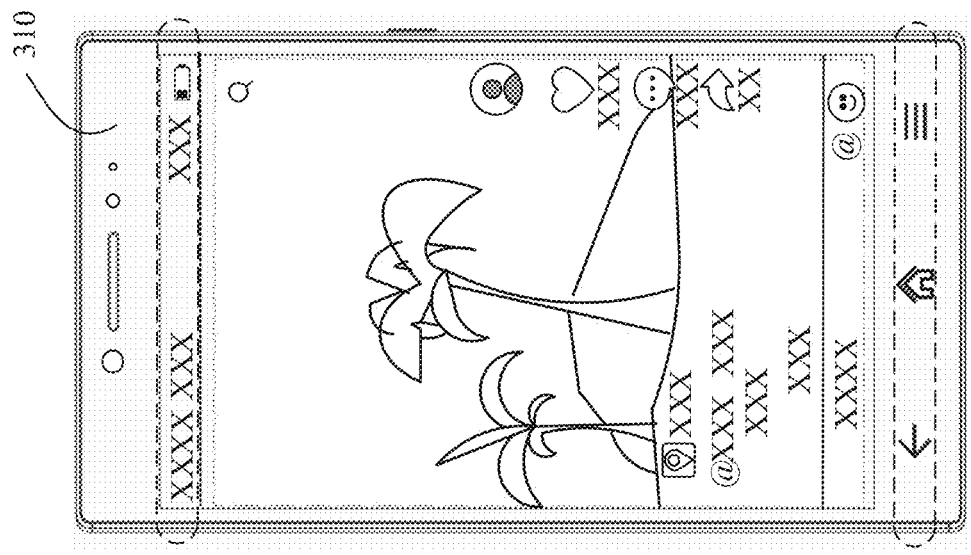
The intelligent window is not displayed
310
30 seconds after the display duration is reached
TO FIG. 5A(2)
FIG. 5A(1)

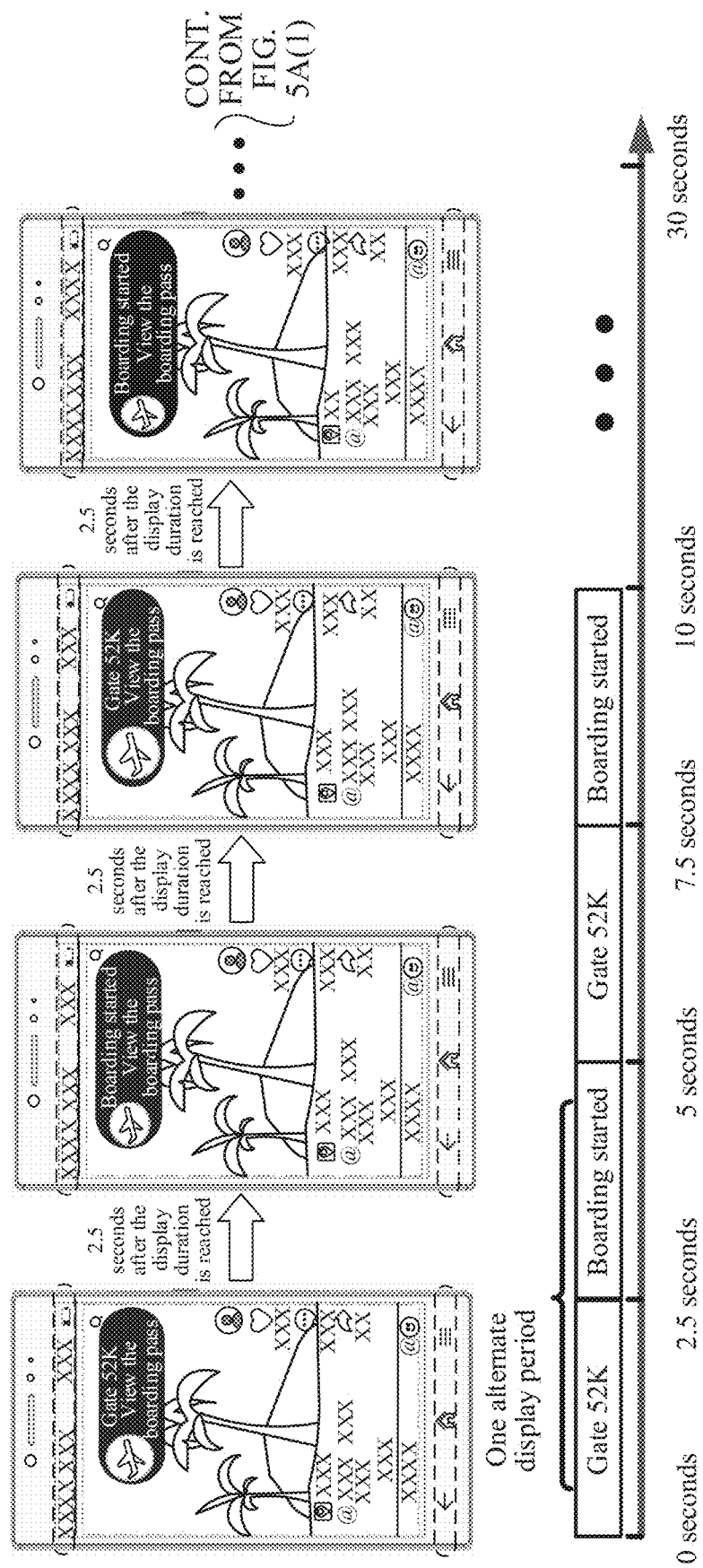
FIG. 5A(2)

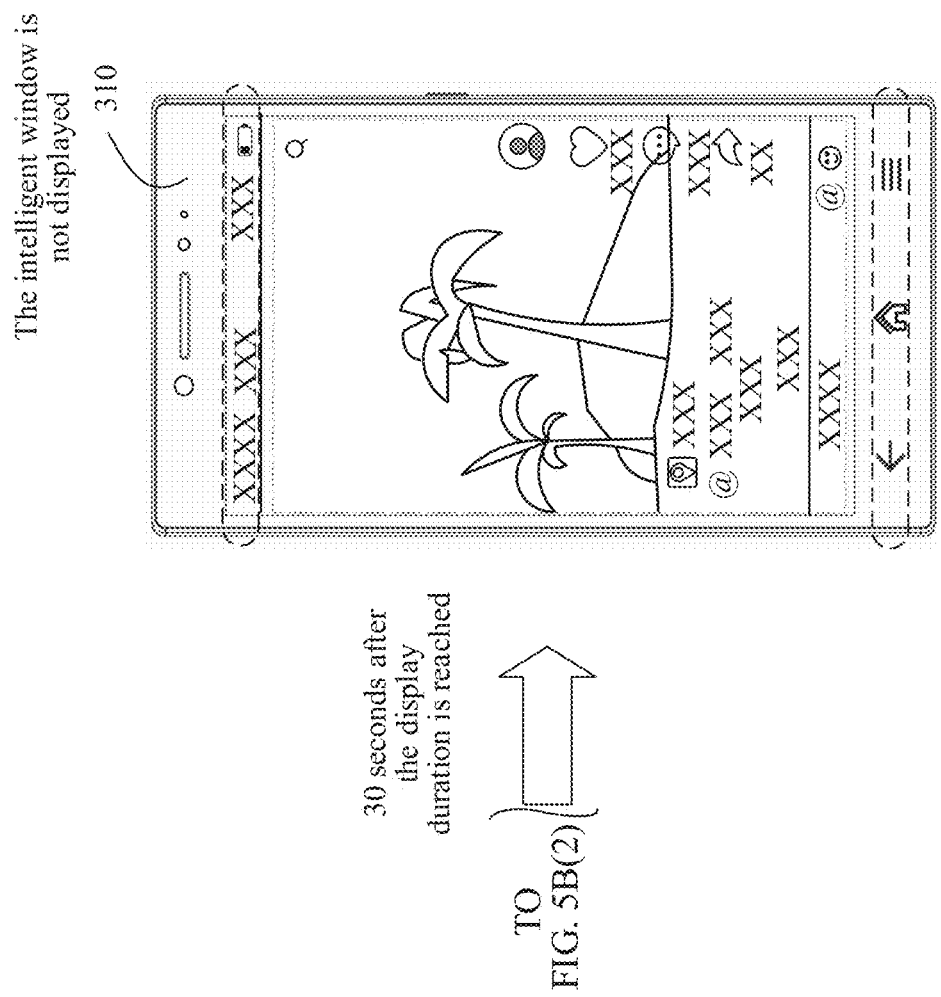
FIG. 5B(1)

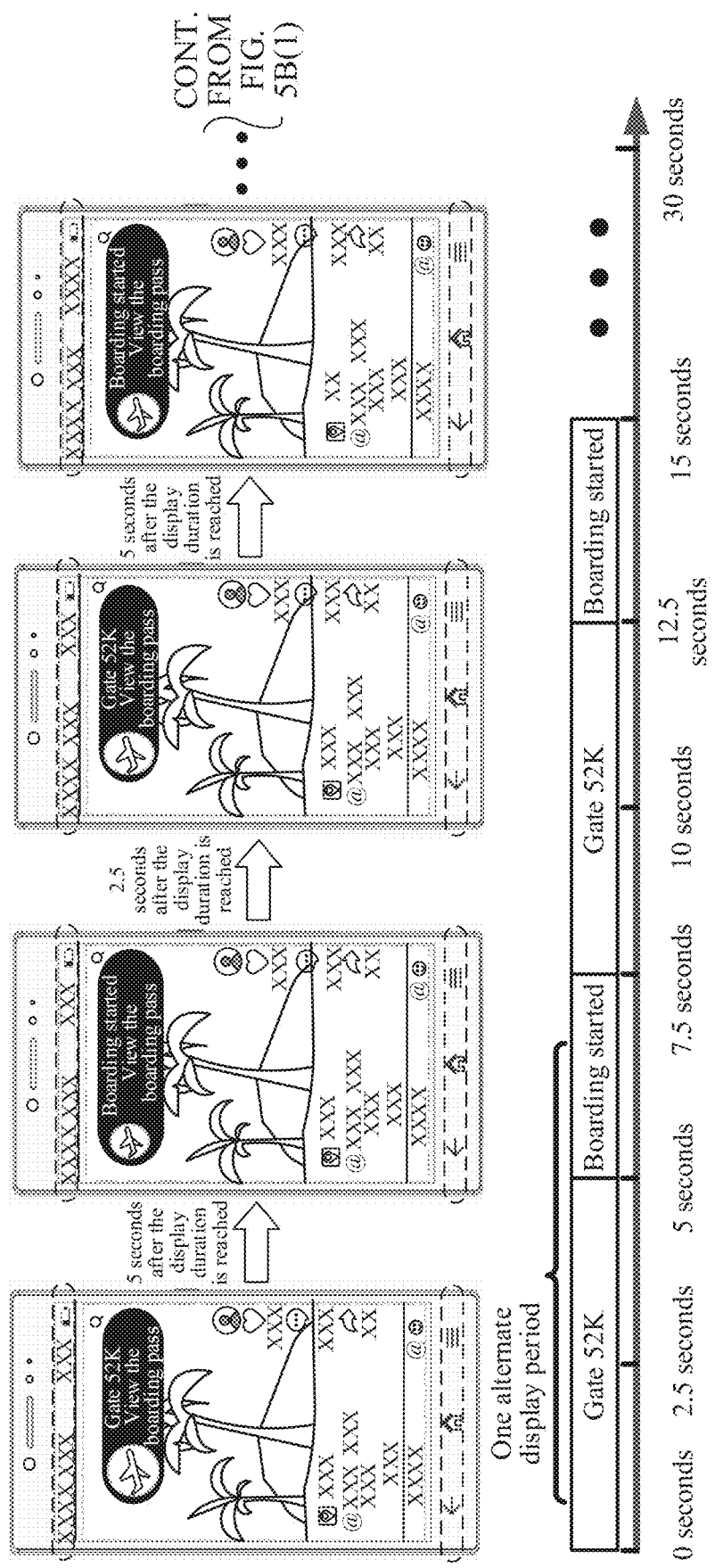
FIG. 5B(2)

INFORMATION DISPLAY METHOD AND ELECTRONIC DEVICE

CROSS-REFERENCE TO RELATED APPLICATIONS

This application is a national stage of International Application No. PCT/CN2022/092916, filed on May 16, 2022, which claims priority to Chinese Patent Application No. 202110927115.5, filed on Aug. 12, 2021. The disclosures of both of the aforementioned applications are hereby incorporated by reference in their entireties.

TECHNICAL FIELD

This application relates to the field of terminals and the field of communication technologies, and in particular, to an information display method and an electronic device.

BACKGROUND

As mobile terminals enter the intelligent era, large-screen terminals become increasingly popular, and an increasing quantity of applications are installed on these terminals. To meet user requirements such as flexible operations, a floating window emerges correspondingly. The floating window can quickly provide functional operations and application navigation for a user. Currently, prompt information may be displayed in the floating window to prompt the user. However, when the floating window is used to prompt the user, floating windows corresponding to all prompt information are always displayed on a user interface, causing great interference to the user.

SUMMARY

This application provides an information display method and an electronic device, to display an intelligent window when a preset condition is met, and automatically adjust display duration of the intelligent window based on importance of reminder information, so as to improve user experience.

According to a first aspect, this application provides an information display method, including: displaying, by an electronic device, a first user interface, where the first user interface is an interface of a first application, or the first user interface is a home screen of the electronic device; when the electronic device determines that a difference between a current moment and a boarding moment is within preset reminder duration, displaying, by the electronic device, a display window on the first user interface, and displaying first flight information in the display window, where a size of the display window is less than ¼ of a size of a display area of the first user interface; determining, by the electronic device based on importance of the first flight information, that display duration of the display window is first window display duration; obtaining, by the electronic device, second flight information within the first window display duration in which the display window is displayed, and alternately displaying the first flight information and the second flight information in the display window based on a preset cycle; and stopping, by the electronic device, displaying the display window after duration in which the electronic device displays the display window reaches preset display duration, where the preset display duration is window display duration corresponding to flight information with higher importance in the first flight information and the second flight information.

In the foregoing implementation, when determining that the boarding moment of a flight is to arrive, the electronic device may directly and automatically display a small display window on the first user interface, and display the first flight information in the display window. If the second flight information is obtained during the first window display duration in which the first flight information is displayed, the first flight information and the second flight information may be directly and alternately displayed in the display window based on the preset period. Displaying of the display window may be stopped after the display window is continuously displayed for the preset display duration. In this way, the display window can be automatically displayed when a condition is met, and display duration of the display window can be automatically adjusted based on importance of displayed flight information, to enable a user to quickly obtain flight information and prevent the display window from causing interference to the user.

With reference to some implementations of the first aspect, in some implementations, importance of the second flight information is higher than importance of the first flight information; and within one period of displaying the first flight information and the second flight information, reminder display duration of displaying the second flight information is longer than reminder display duration of displaying the first flight information.

In the foregoing implementation, when a plurality of pieces of flight information are alternately displayed in the display window, more important flight information can be displayed for a longer period of time.

With reference to some implementations of the first aspect, in some implementations, within one period of displaying the second flight information and the first flight information, reminder display duration of displaying the second flight information is equal to reminder display duration of displaying the first flight information.

In the foregoing implementation, when a plurality of pieces of flight information are alternately displayed in the display window, display time with a same length may alternatively be allocated to each piece of flight information.

With reference to some implementations of the first aspect, in some implementations, importance of the second flight information is higher than importance of the first flight information; and within one period of displaying the first flight information and the second flight information, the second flight information is displayed before the first flight information.

In the foregoing implementation, when a plurality of pieces of flight information are alternately displayed in the display window, more important flight information may be preferentially displayed.

With reference to some implementations of the first aspect, in some implementations, importance of the second flight information is higher than importance of the first flight information, and time at which the second flight information is obtained is earlier than time at which the first flight information is obtained; and within one period of displaying the first flight information and the second flight information, the second flight information is displayed before the first flight information.

In the foregoing implementation, when a plurality of pieces of flight information are alternately displayed in the display window, flight information obtained earlier may be preferentially displayed.

With reference to some implementations of the first aspect, in some implementations, the method further includes: obtaining, by the electronic device, third flight information after stopping displaying the display window, where the importance of the third flight information is higher than that of the first flight information and the second flight information; determining, by the electronic device based on the importance of the third flight information, that display duration of the display window is second window display duration, where the second window display duration is longer than the first window display duration; and stopping, by the electronic device, displaying the display window after duration in which the electronic device displays the display window reaches the second window display duration.

In the foregoing implementation mode, when flight information with higher importance is obtained, the flight information with higher importance may be displayed in the display window for a longer period of time before displaying of the display window is stopped.

According to a second aspect, this application provides an information display method, including: displaying, by an electronic device, a first user interface, where the first user interface is an interface of a first application, or the first user interface is a home screen of the electronic device; when a first preset condition is met, displaying, by the electronic device, a display window on the first user interface, and displaying first reminder information in the display window, where a size of the display window is less than ¼ of a size of a display area of the first user interface; determining, by the electronic device based on importance of the first reminder information, that display duration of the display window is first window display duration; when a second preset condition is met, alternately displaying, by the electronic device, the first reminder information and second reminder information in the display window based on a preset period within the first window display duration in which the display window is displayed; and stopping, by the electronic device, displaying the display window after duration in which the electronic device displays the display window reaches preset display duration, where the preset display duration is window display duration corresponding to reminder information with higher importance in the first reminder information and the second reminder information.

In the foregoing implementation, when determining that the first preset condition is met, the electronic device may directly and automatically display a small display window on the first user interface, and display the first reminder information in the display window. If the second preset condition is met during the first window display duration in which the first reminder information is displayed, the first reminder information and the second reminder information may be directly and alternately displayed in the display window based on the preset period. Displaying of the display window may be stopped after the display window is continuously displayed for the preset display duration. In this way, the display window can be automatically displayed when a condition is met, and display duration of the display window can be automatically adjusted based on importance of displayed reminder information, to enable a user to quickly obtain reminder information and prevent the display window from causing interference to the user.

With reference to some implementations of the second aspect, in some implementations, importance of the first reminder information is higher than importance of the second reminder information; and within one period of displaying the first reminder information and the second reminder information, reminder display duration of displaying the first reminder information is longer than reminder display duration of displaying the second reminder information.

In the foregoing implementation, when a plurality of pieces of reminder information are alternately displayed in the display window, more important reminder information can be displayed for a longer period of time.

With reference to some implementations of the second aspect, in some implementations, importance of the first reminder information is higher than, equal to, or lower than importance of the second reminder information; and within one period of displaying the first reminder information and the second reminder information, reminder display duration of displaying the first reminder information is equal to reminder display duration of displaying the second reminder information.

In the foregoing implementation, when a plurality of pieces of reminder information are alternately displayed in the display window, display time with a same length may alternatively be allocated to each piece of reminder information.

With reference to some implementations of the second aspect, in some implementations, importance of the first reminder information is higher than importance of the second reminder information; and within one period of displaying the first reminder information and the second reminder information, the first reminder information is displayed before the second reminder information.

In the foregoing implementation, when a plurality of pieces of reminder information are alternately displayed in the display window, more important reminder information may be preferentially displayed.

With reference to some implementations of the second aspect, in some implementations, importance of the first reminder information is equal than importance of the second reminder information, and time at which the first reminder information is obtained is earlier than time at which the second reminder information is obtained; and within one period of displaying the first reminder information and the second reminder information, the second reminder information is displayed before the first reminder information.

In the foregoing implementation, when a plurality of pieces of reminder information are alternately displayed in the display window, reminder information obtained earlier may be preferentially displayed.

With reference to some implementations of the second aspect, in some implementations, the method further includes: after the electronic device stops displaying the display window and when the electronic device determines that a third preset condition is met, displaying, by the electronic device, a display window on the first user interface, and displaying third reminder information in the display window, where importance of the third reminder information is higher than that of the first reminder information and the second reminder information; and determining, by the electronic device based on the importance of the third reminder information, that display duration of the display window is second window display duration, where the second window display duration is longer than the first window display duration; and stopping, by the electronic device, displaying the display window after duration in which the electronic device displays the display window reaches the second window display duration.

In the foregoing implementation mode, when reminder information with higher importance is obtained, the reminder information with higher importance may be displayed in the display window for a longer period of time before displaying of the display window is stopped.

According to a third aspect, this application provides an electronic device. The electronic device includes: one or more processors and a memory; and the memory is coupled to the one or more processors, the memory is configured to store computer program code, the computer program code includes computer instructions, and the one or more processors invoke the computer instructions to enable the electronic device to perform the following operations: displaying a first user interface on a display screen, where the first user interface is an interface of a first application, or the first user interface is a home screen of the electronic device; determining that a difference between a current moment and a boarding moment is within preset reminder duration, displaying a display window on the first user interface on the display screen, and displaying first flight information in the display window, where a size of the display window is less than ¼ of a size of a display area of the first user interface; determining, based on importance of the first flight information, that display duration of the display window is first window display duration; obtaining second flight information within the first window display duration in which the display window is displayed on the display screen, and alternately displaying the first flight information and the second flight information in the display window based on a preset period; and stopping displaying the display window after duration in which the display window is displayed on the display screen reaches preset display duration, where the preset display duration is window display duration corresponding to flight information with higher importance in the first flight information and the second flight information.

With reference to some implementations of the third aspect, in some implementations, importance of the second flight information is higher than importance of the first flight information; and within one period of displaying the first flight information and the second flight information, reminder display duration of displaying the second flight information is longer than reminder display duration of displaying the first flight information.

With reference to some implementations of the third aspect, in some implementations, within one period of displaying the second flight information and the first flight information, reminder display duration of displaying the second flight information is equal to reminder display duration of displaying the first flight information.

With reference to some implementations of the third aspect, in some implementations, importance of the second flight information is higher than importance of the first flight information, and time at which the second flight information is obtained is earlier than time at which the first flight information is obtained; and within one period of displaying the first flight information and the second flight information, the second flight information is displayed before the first flight information.

With reference to some implementations of the third aspect, in some implementations, the one or more processors are further configured to invoke the computer instructions to enable the electronic device to perform the following operations: obtaining third flight information after stopping displaying the display window, where importance of the third flight information is higher than that of the first flight information and the second flight information; determining, based on the importance of the third flight information, that display duration of the display window is second window display duration, where the second window display duration is longer than the first window display duration; and stopping, by the electronic device, displaying the display window after duration in which the display window is displayed on the display screen reaches the second window display duration.

According to a fourth aspect, this application provides an electronic device. The electronic device includes: one or more processors and a memory; and the memory is coupled to the one or more processors, the memory is configured to store computer program code, the computer program code includes computer instructions, and the one or more processors invoke the computer instructions to enable the electronic device to perform the following operations: displaying a first user interface on a display screen, where the first user interface is an interface of a first application, or the first user interface is a home screen of the electronic device; when a first preset condition is met, displaying a display window on the first user interface, and displaying first reminder information in the display window on the display screen, where a size of the display window is less than ¼ of a size of a display area of the first user interface; determining, based on importance of the first reminder information, that display duration of the display window is first window display duration; when a second preset condition is met, alternately displaying, by the electronic device, the first reminder information and second reminder information in the display window based on a preset period within the first window display duration in which the display window is displayed on the display screen; and stopping displaying the display window after duration in which the display window is displayed on the display screen reaches preset display duration, where the preset display duration is window display duration corresponding to reminder information with higher importance in the first reminder information and the second reminder information.

With reference to some implementations of the fourth aspect, in some implementations, importance of the first reminder information is higher than importance of the second reminder information; and within one period of displaying the first reminder information and the second reminder information, reminder display duration of displaying the first reminder information is longer than reminder display duration of displaying the second reminder information.

With reference to some implementations of the fourth aspect, in some implementations, importance of the first reminder information is higher than, equal to, or lower than importance of the second reminder information; and within one period of displaying the first reminder information and the second reminder information, reminder display duration of displaying the first reminder information is equal to reminder display duration of displaying the second reminder information.

With reference to some implementations of the fourth aspect, in some implementations, importance of the first reminder information is higher than importance of the second reminder information; and within one period of displaying the first reminder information and the second reminder information, the first reminder information is displayed before the second reminder information.

With reference to some implementations of the fourth aspect, in some implementations, importance of the first reminder information is equal than importance of the second reminder information, and time at which the first reminder information is obtained is earlier than time at which the second reminder information is obtained; and within one period of displaying the first reminder information and the second reminder information, the second reminder information is displayed before the first reminder information.

With reference to some implementations of the fourth aspect, in some implementations, the one or more processors are further configured to invoke the computer instructions to enable the electronic device to perform the following operations: after stopping displaying the display window on the display screen and when determining that a third preset condition is met, displaying a display window on the first user interface on the display screen, and displaying third reminder information in the display window, where importance of the third reminder information is higher than that of the first reminder information and the second reminder information; and determining, based on the importance of the third reminder information, that display duration of the display window is second window display duration, where the second window display duration is longer than the first window display duration; and stopping displaying the display window after duration in which the display window is displayed on the display screen reaches the second window display duration.

According to a fifth aspect, this application provides a chip system, where the chip system is applied to an electronic device, the chip system includes one or more processors, and the processor is configured to invoke computer instructions to enable the electronic device to perform the method described in any one of the first aspect or the possible implementations of the first aspect, or any one of the second aspect or the possible implementations of the second aspect.

It can be understood that the chip system may include one processor 101 in an electronic device 100 shown in FIG. 2A, or may include a plurality of processors 101 in the electronic device 100 shown in FIG. 2A, and the chip system may further include another one or more chips. For example, the chip system may include an image signal processing chip in a camera 108 in the electronic device 100 shown in FIG. 2A, or may include an image display chip in a display screen 109. This is not limited herein.

According to a sixth aspect, this application provides a computer program product including instructions, and when the computer program product runs on an electronic device, the electronic device is enabled to perform the method described in any one of the first aspect or the possible implementations of the first aspect, or any one of the second aspect or the possible implementations of the second aspect.

According to a seventh aspect, this application provides a computer-readable storage medium including instructions, where when the instructions run on an electronic device, the electronic device is enabled to perform the method described in any one of the first aspect or the possible implementations of the first aspect, or any one of the second aspect or the possible implementations of the second aspect.

It can be understood that the electronic device provided in the third aspect, the electronic device provided in the fourth aspect, the chip system provided in the fifth aspect, the computer program product provided in the sixth aspect, and the computer storage medium provided in the seventh aspect are all configured to perform the method provided in this application. Therefore, for beneficial effects that can be achieved, refer to the beneficial effects in the corresponding method. Details are not described herein again.

BRIEF DESCRIPTION OF DRAWINGS

FIG. 3A to FIG. 3D(1), FIG. 3D(2), and FIG. 3D(3) show a process of displaying an intelligent window according to an embodiment of this application;

FIG. 5A(1), FIG. 5A(2), FIG. 5B(1), and FIG. 5B(2) show a process of alternately displaying a plurality of pieces of reminder information in an intelligent window according to an embodiment of this application;

DESCRIPTION OF EMBODIMENTS

The following clearly and thoroughly describes technical solutions in embodiments of this application with reference to the accompanying drawings. In the descriptions of the embodiments of this application, "I" means "or" unless otherwise specified. For example, A/B may represent A or B. The term "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more.

The terms "first" and "second" mentioned below are merely intended for a purpose of description, and shall not be understood as an indication or implication of relative importance or implicit indication of the quantity of indicated technical features. Therefore, a feature limited by "first" or "second" may explicitly or implicitly include one or more features. In the descriptions of the embodiments of this application, "a plurality of" means two or more than two, unless otherwise specified.

The term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (XML). Interface source code is parsed and rendered on an electronic device, and is finally presented as content that can be identified by the user. The user interface is usually represented in a form of a graphical user interface (GUI), and is a user interface that is related to a computer operation and that is displayed in a graphic manner. The user interface may be an interface element such as a text, an icon, a button, a menu, a tab, a text box, a dialog box, a status bar, a navigation bar, or a widget displayed on a display screen of the electronic device.

Figure 1A:
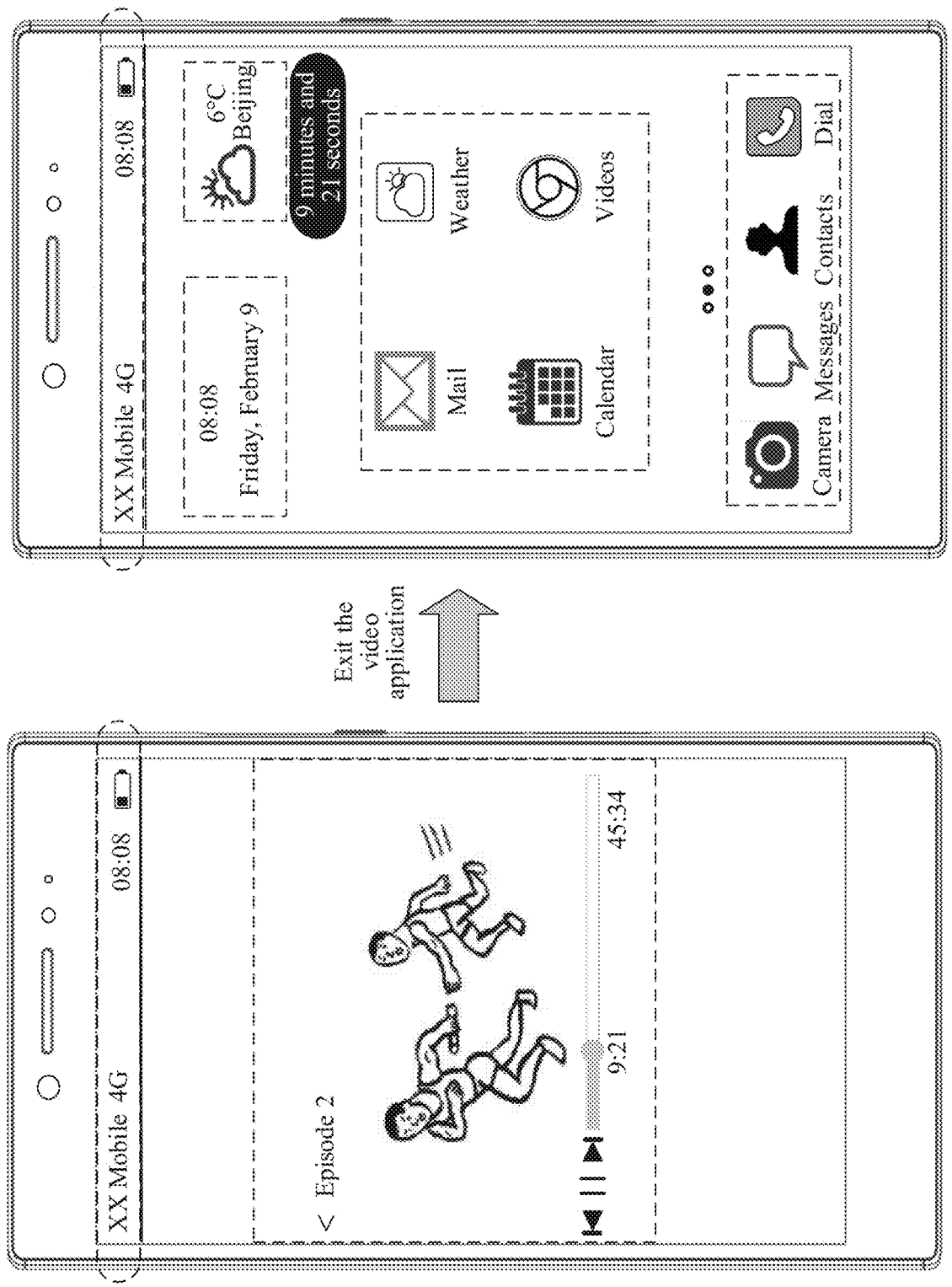
FIG. 1A to FIG. 1C are schematic diagrams of a scenario provided in the related art.

In a manner in which reminder information is displayed in a floating window, as shown in FIG. 1A, if a user is using an electronic device to start a video application to watch a video, and the user needs to use the electronic device to check weather, the user may switch the electronic device to a home screen. In this case, the electronic device may switch the video application from a foreground running state to a background running state, and display a floating window for the video application.

Figure 1B:
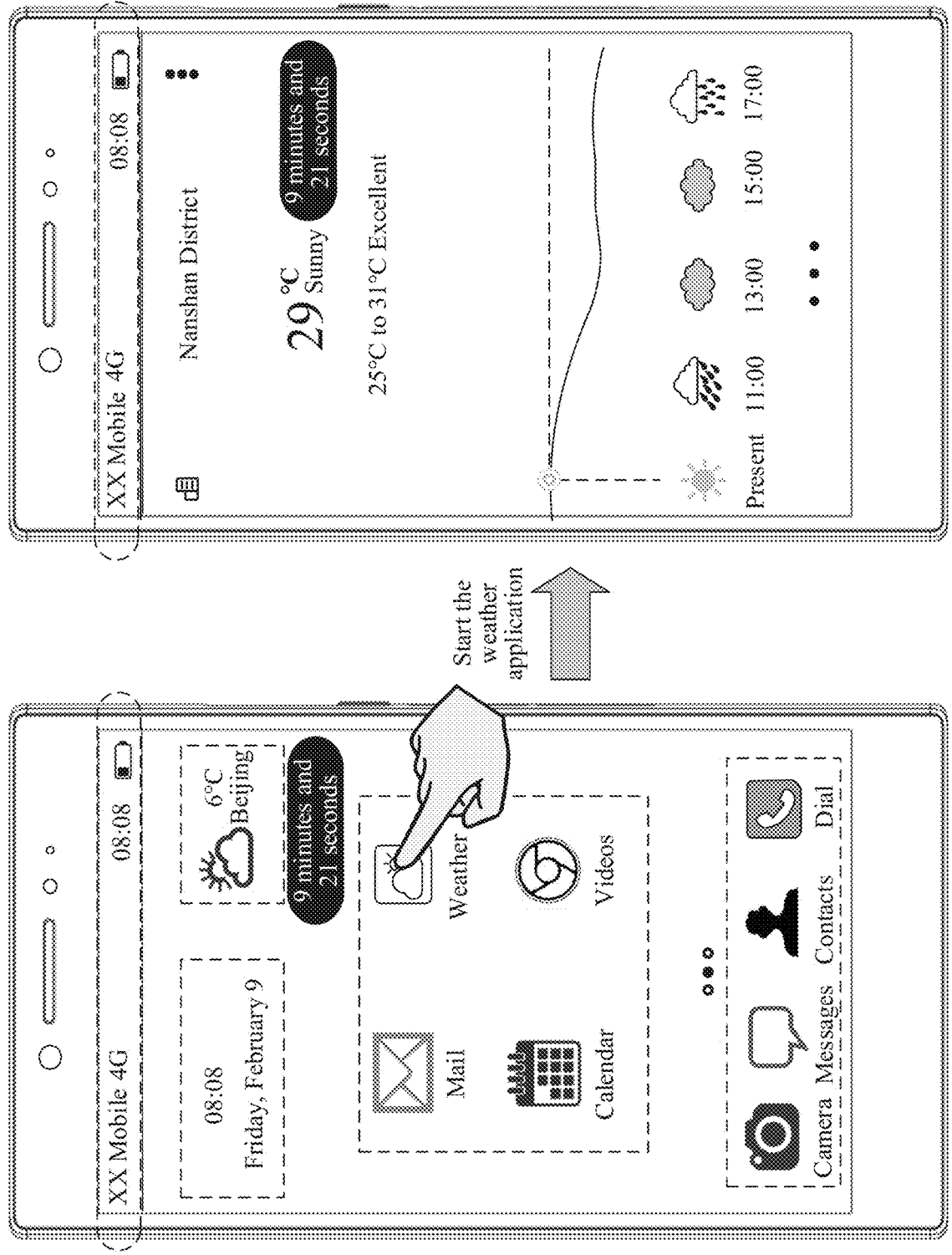
Figure 1C:
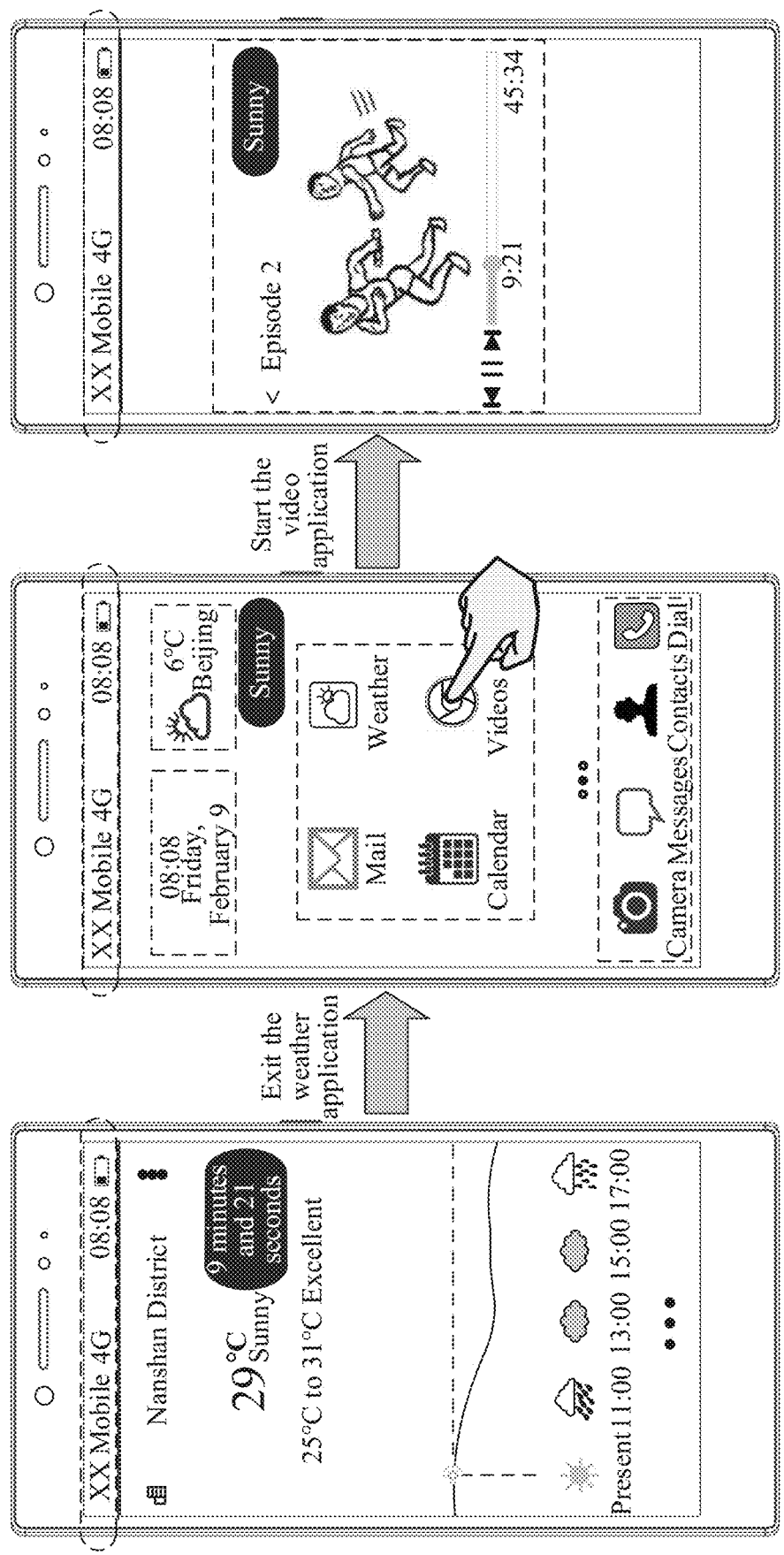

As shown in FIG. 1B, the user taps to start a weather application to view weather. If weather changes greatly on the day, the user wants to follow weather changes in real time and wants weather change information to be displayed in a floating window. Because the electronic device already displays the floating window for the video application, weather information cannot be directly displayed in the floating window. Therefore, as shown in FIG. 1C, the user needs to switch the weather application to the background, so that the electronic device can display a floating window for the weather application to follow weather changes of the day in real time.

In this reminder manner, in one aspect, when the user needs to view prompt information for an application A in a floating window, the user needs to first start the application A, and then exit the application A to switch it to the background, so that the electronic device displays a floating window for the application A. Operations are complex.

In another aspect, floating windows corresponding to all prompt information are continuously displayed on a user interface of the electronic device. For example, the electronic device continuously displays the floating window for the weather application or the floating window for the video application on a current user interface, until the user starts another application and then exits the application to switch it to the background. Then prompt information for the weather application or the video application is not displayed in the floating window. This affects user operations and causes interference to the user, resulting in poor user experience.

However, in an information display method provided in the embodiments of this application, even if the electronic device is displaying a user interface of the application A, when a display condition B for an intelligent window is met, the electronic device directly displays the intelligent window on the user interface of the application A, and displays reminder information corresponding to the display condition B in the intelligent window. In addition, the electronic device may automatically adjust display duration of the intelligent window based on a current scenario. Different reminder information corresponds to different display duration of the intelligent window. After the display duration of the intelligent window elapses, the electronic device automatically hides the intelligent window.

Figure 1D:
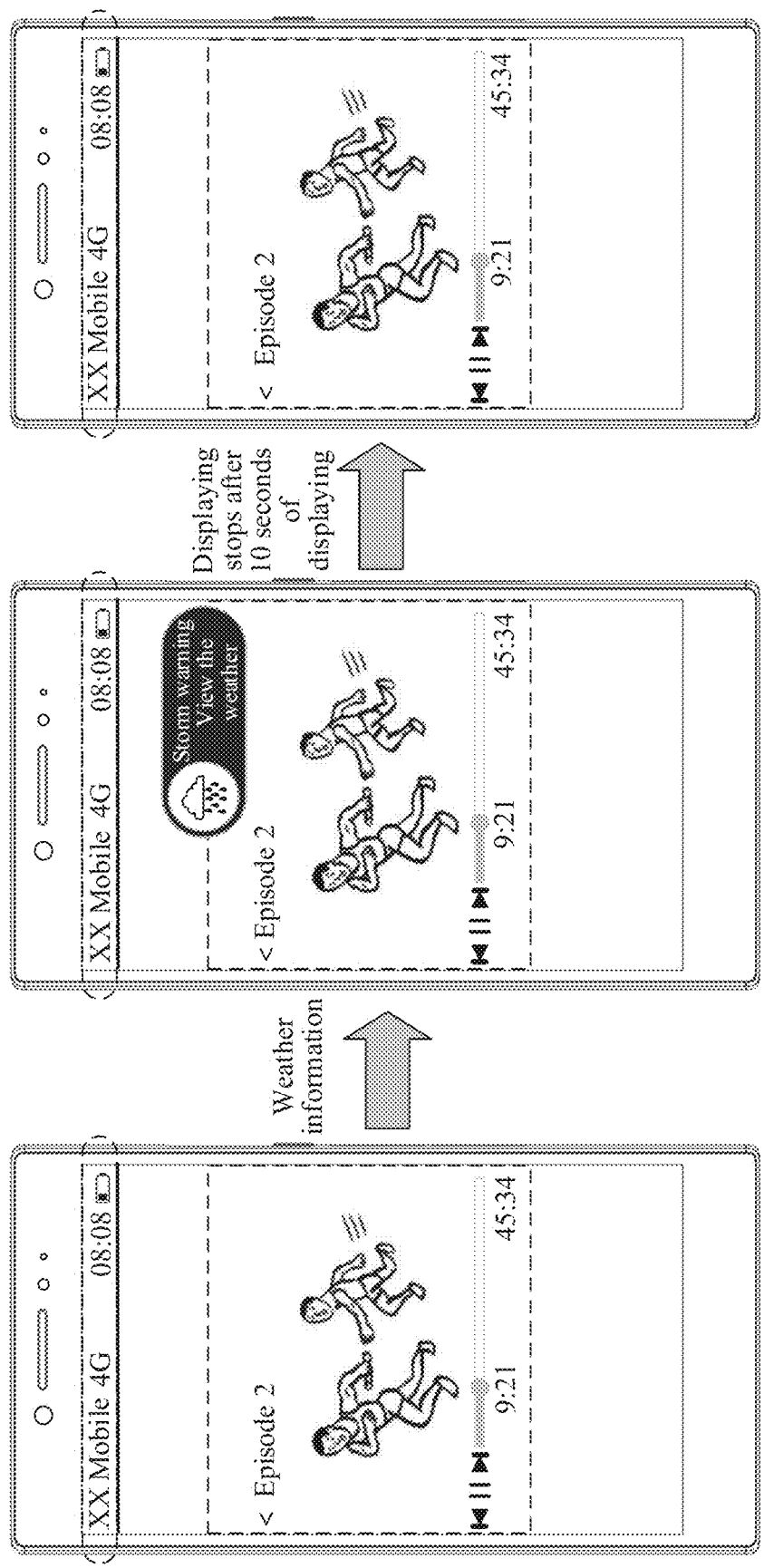
FIG. 1D and FIG. 1E are schematic diagrams of an information display method according to an embodiment of this application.
Figure 1E:
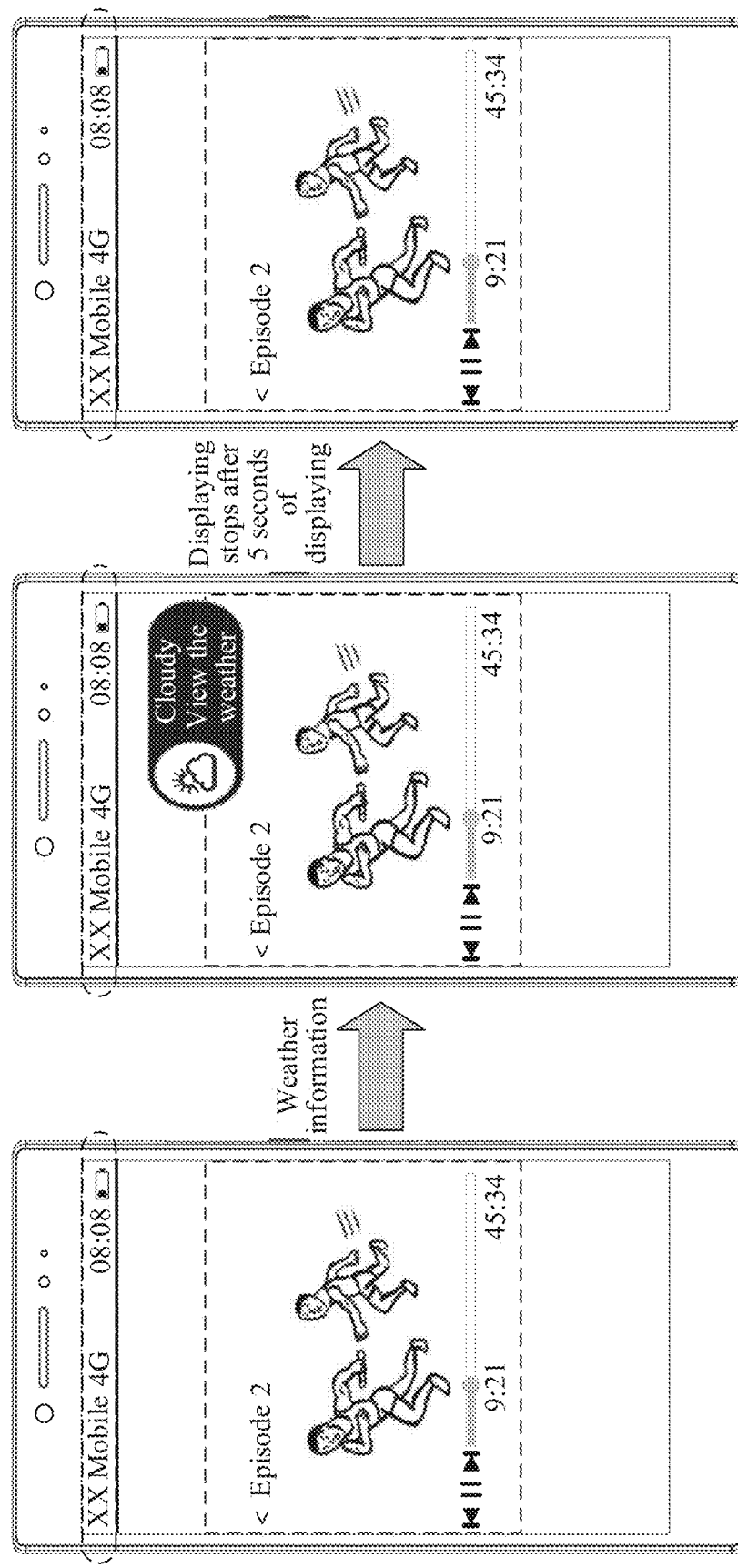

For example, as shown in FIG. 1D, the user is using the electronic device to start the video application to watch a video, and the electronic device is displaying a user interface of the video application. When weather changes greatly on the day and the electronic device obtains weather warning information, the electronic device may display an intelligent window on the interface of the video application, and display a storm warning in the intelligent window to remind the user. After 10 seconds of display, the electronic device hides the intelligent window, and no longer displays the intelligent window on the current user interface. The electronic device continuously obtains weather information when the user continues to watch the video by using the video application. As shown in FIG. 1E, when the electronic device learns that weather is sunny, the electronic device displays an intelligent window on the interface of the video application, and displays cloudy in the intelligent window. After 5 seconds of display, the electronic device hides the intelligent window, and no longer displays the intelligent window on the current interface.

In this way, in one aspect, when a display condition for an intelligent window of the application A are met, the electronic device directly displays the intelligent window on a currently displayed interface, and displays related information of the application A in the intelligent window, and the user does not need to manually start the application A and then exit the application A. This is more convenient.

In another aspect, the electronic device may adjust display duration of the intelligent window based on importance of a current scenario. For important reminder information, the intelligent window may be displayed for a long time, to prevent the user from missing important information. For reminder information with low importance, the intelligent window may be displayed for a short time, to avoid interference to the user. After the display duration of the intelligent window elapses, the electronic device automatically hides and no longer displays the intelligent window, without interference to the user.

It should be noted that the intelligent window is a movable window that is provided by the preset application A on the electronic device and that is displayed on an interface of another application or a home screen in a floating manner. When another application is not started on the electronic device, the application A may also obtain key information of the another application, and display the obtained key information of the another application in the intelligent window provided by the application A, for reminding and/or triggering startup of the another application. Compared with a conventional floating window, the intelligent window may occupy a smaller area, and when a condition is met, the intelligent window may change to a display form more suitable for a current scenario, for example, is displayed in a capsule, rectangular, or circular form, to further reduce an occupied area or even be hidden. Therefore, impact on content displayed on a current user interface is reduced during displaying of the key information of the another application.

In some embodiments, the intelligent window in the embodiments of this application may also be referred to as a display window.

It should be noted that the application A is a system application.

In the embodiments of this application, a system application is an application provided or developed by a producer of the electronic device, and the producer of the electronic device may include a manufacturer, a supplier, a provider, an operator, or the like of the electronic device. The manufacturer may be a vendor that processes and manufactures the electronic device by using self-made or purchased parts and raw materials. The supplier may be a vendor that provides an entire system, raw materials, or parts of the electronic device. The operator may be a vendor responsible for distribution of the electronic device. For example, APPs independently developed by Honor, such as Honor Wearables, Hihonor, and Honor Video, are system applications. Correspondingly, a third-party application is an application that is not provided or developed by the producer of the electronic device. In some embodiments, a third-party application may alternatively be an application that is not preinstalled on the electronic device. For example, APPs such as WeChat and Taobao are third-party applications for a Honor mobile phone.

Figure 2A:
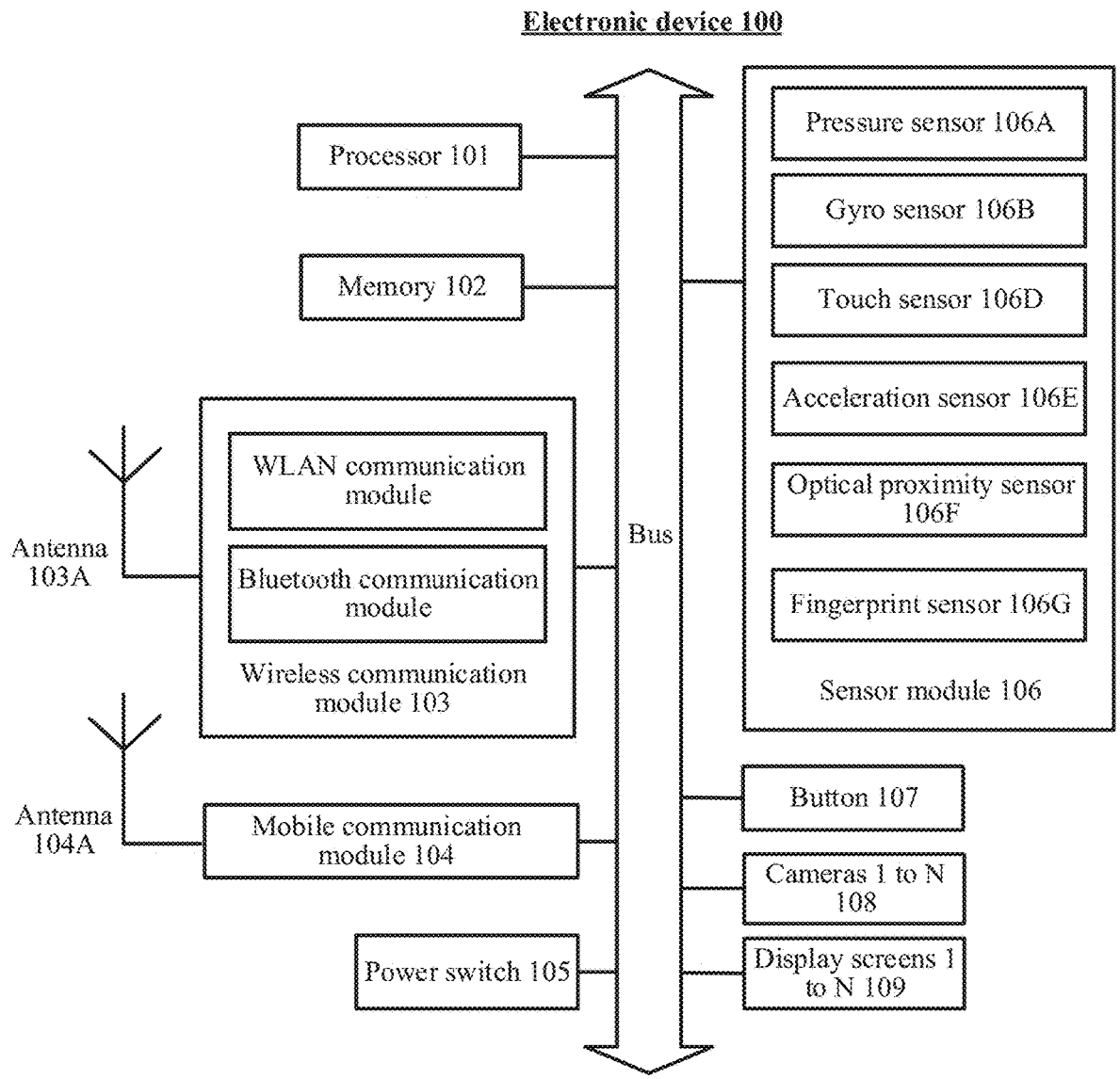
FIG. 2A is a schematic structural diagram of an electronic device 100 according to an embodiment of this application.

With reference to FIG. 2A, the following describes an example electronic device provided in the following embodiments of this application. The electronic device in this application may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, or an artificial intelligence (AI) device. A specific type of the electronic device is not particularly limited in the embodiments of this application. An example embodiment of the electronic device 100 includes but is not limited to a portable electronic device or a non-portable device using iOS®, Android®, Harmony®, Windows®, Linux, or another operating system.

FIG. 2A is a schematic structural diagram of an example electronic device 100 according to an embodiment of this application.

The electronic device 100 may include a processor 101, a memory 102, a wireless communication module 103, a mobile communication module 104, an antenna 103A, an antenna 104A, a power switch 105, a sensor module 106, a button 107, a camera 108, a display screen 109, and the like. The sensor module 106 may include a pressure sensor 106A, a gyro sensor 106B, a touch sensor 106D, an acceleration sensor 106E, an optical proximity sensor 106F, a fingerprint sensor 106G, and the like. The wireless communication module 103 may include a WLAN communication module, a Bluetooth communication module, and the like. The foregoing plurality of parts may transmit data through a bus.

It can be understood that the structure shown in this embodiment of the present disclosure does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 101 may include one or more processing units. For example, the processor 101 may include an application processor (AP), a modem processor, a graphics processing unit (GPU), an image signal processor (ISP), a controller, a memory, a video codec, a digital signal processor (DSP)) a baseband processor, a neural-network processing unit (NPU), and/or the like. Different processing units may be separate devices, or may be integrated into one or more processors.

In some embodiments of this application, the processor 101 may be configured to determine that a first preset condition is met, and drive the display screen 109 to display an intelligent window, or the like.

The controller may be a nerve center and a command center of the electronic device 100. The controller may generate an operation control signal based on an instruction operation code and a time sequence signal, to control instruction fetching and instruction execution.

A memory may be further disposed in the processor 101 to store instructions and data. In some embodiments, the memory in the processor 101 is a cache memory. The memory may store instructions or data that has been used or is cyclically used by the processor 101. If the processor 101 needs to use the instructions or the data again, the processor may directly invoke the instructions or the data from the memory. This avoids repeated access and reduces waiting time of the processor 101, and therefore improves system efficiency. In some embodiments, the processor 101 may include one or more interfaces. The interface may include an integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules illustrated in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

A wireless communication function of the electronic device 100 may be implemented by using the antenna 104A, the antenna 103A, the mobile communication module 104, the wireless communication module 103, the modem processor, the baseband processor, and the like.

The antenna 104A and the antenna 103A are configured to transmit and receive an electromagnetic wave signal. Each antenna of the electronic device 100 may be configured to cover one or more communication frequency bands. Different antennas may be further multiplexed to improve utilization of the antennas. For example, the antenna 104A may be multiplexed as a diversity antenna of a wireless local area network. In some other embodiments, the antennas may be used with a tuning switch.

The mobile communication module 104 may provide a solution applied to the electronic device 100 for wireless communication such as 2G/3G/4G/5G. The mobile communication module 104 may include at least one filter, a switch, a power amplifier, a low noise amplifier (LNA), and the like. The mobile communication module 104 may receive an electromagnetic wave through the antenna 104A, perform processing such as filtering or amplification on the received electromagnetic wave, and transmit the electromagnetic wave to the modem processor for demodulation. The mobile communication module 104 may further amplify a signal modulated by the modem processor, and convert the signal into an electromagnetic wave for radiation through the antenna 104A. In some embodiments, at least some functional modules of the mobile communication module 104 may be disposed in the processor 101. In some embodiments, at least some functional modules of the mobile communication module 104 may be disposed in a same device as at least some modules of the processor 101.

The modem processor may include a modulator and a demodulator. In some embodiments, the modem processor may be an independent device. In some other embodiments, the modem processor may be independent of the processor 101, and is disposed in a same device as the mobile communication module 104 or another functional module.

The wireless communication module 103 may provide a solution applied to the electronic device 100 for wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, or an infrared (IR) technology. The wireless communication module 103 may be one or more devices integrating at least one communication processor module. The wireless communication module 103 receives an electromagnetic wave through the antenna 103A, performs frequency modulation and filtering processing on an electromagnetic wave signal, and sends a processed signal to the processor 101. The wireless communication module 103 may further receive a to-be-sent signal from the processor 101, perform frequency modulation and amplification on the signal, and convert the signal into an electromagnetic wave for radiation through the antenna 103A.

In some embodiments, the antenna 104A of the electronic device 100 is coupled to the mobile communication module 104, and the antenna 103A is coupled to the wireless communication module 103, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (long term evolution, LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

In some embodiments of this application, positioning information of the electronic device may be obtained through the GPS.

The electronic device 100 implements a display function by using the GPU, the display screen 109, the application processor, and the like. The GPU is a microprocessor for image processing, and is connected to the display screen 109 and the application processor. The GPU is configured to perform mathematical and geometric computation, and render an image. The processor 101 may include one or more GPUs that execute program instructions to generate or change display information.

The display screen 109 is configured to display an image, a video, or the like. The display screen 109 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include 1 or N display screens 109, where N is a positive integer greater than 1.

In some embodiments of this application, the display screen 109 may be configured to display a user interface implemented on the electronic device in subsequent embodiments. For example, interface content is a video play interface provided by a video application. For a specific implementation of the user interface, refer to subsequent embodiments. Details are not described herein.

The camera 108 is configured to capture a static image or a video. An optical image of an object is generated through a lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include 1 or N cameras 108, where N is a positive integer greater than 1.

The memory 102 may be configured to store computer-executable program code, where the executable program code includes instructions. The processor 101 runs the instructions stored in the memory 102, to implement various functional applications and data processing of the electronic device 100. The memory 102 may include a program storage area and a data storage area. The program storage area may store an operating system, an application required by at least one function (for example, a sound play function or an image play function), and the like. The data storage area may store data (such as audio data and an address book) and the like that are created during use of the electronic device 100. In addition, the memory 102 may include a high-speed random access memory, or may include a nonvolatile memory, for example, at least one magnetic disk storage device, a flash memory, or a universal flash storage (UFS).

The pressure sensor 106A is configured to sense a pressure signal, and may convert the pressure signal into an electrical signal. In some embodiments, the pressure sensor 106A may be disposed on the display screen 109. There are a plurality of types of pressure sensors 106A, such as a resistive pressure sensor, an inductive pressure sensor, and a capacitive pressure sensor. The capacitive pressure sensor may include at least two parallel plates made of conductive materials. When a force is applied to the pressure sensor 106A, capacitance between electrodes changes. The electronic device 100 determines pressure intensity based on a capacitance change. When a touch operation is performed on the display screen 109, the electronic device 100 detects intensity of the touch operation based on the pressure sensor 106A. The electronic device 100 may also calculate a touch location based on a detection signal of the pressure sensor 106A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed. In some embodiments of this application, the pressure sensor 106A may be disposed on the display screen 109.

In some embodiments of this application, the pressure sensor 106A may be disposed on the display screen 109. In some optional embodiments of this application, the pressure sensor 106A may be configured to capture a pressure value generated when a finger part of a user touches the display screen, and transmit the pressure value to the processor 101, so that the processor 101 recognizes the finger part through which the user inputs a user operation.

In some embodiments, the pressure sensor 106A may be configured to obtain a pressure value applied by the user to the display screen, to detect a pressing operation performed by the user on the display screen. The electronic device 100 may change a location of the intelligent window on the user interface based on a pressing and dragging operation performed by the user, so as to change a display status of the intelligent window. For details about different display statuses of the intelligent window, see subsequent content. Details are not described herein.

The gyro sensor 106B may be configured to determine a motion posture of the electronic device 100.

The touch sensor 106D is also referred to as a "touch panel". The touch sensor 106D may be disposed on the display screen 109, and the touch sensor 106D and the display screen 109 form a touchscreen, which is also referred to as a "touch control screen". The touch sensor 106D is configured to detect a touch operation performed on or near the touch sensor. The touch sensor may transmit the detected touch operation to the application processor to determine a type of a touch event. Visual output related to the touch operation may be provided by using the display screen 109. In some other embodiments, the touch sensor 106D may alternatively be disposed on a surface of the electronic device 100 at a location different from a location of the display screen 109.

In some optional embodiments of this application, the display screen 109 is equipped with a touch panel that may be configured to receive a touch operation performed by the user. The touch operation is an operation of touching the display screen 109 by a hand or an elbow of the user or by a stylus.

The acceleration sensor 106E may detect accelerations in various directions (usually on three axes) of the electronic device 100. When the electronic device 100 is still, a magnitude and a direction of gravity may be detected. The acceleration sensor may be further configured to recognize a posture of the electronic device, and is applied to applications such as landscape/portrait mode switching and a pedometer.

In some optional embodiments of this application, the acceleration sensor 180E may be configured to capture an acceleration value generated when a finger part of the user touches the display screen, and transmit the acceleration value to the processor 101, so that the processor 101 recognizes the finger part through which the user inputs a user operation.

For example, the optical proximity sensor 106F may include a light-emitting diode (LED) and an optical detector, for example, a photodiode.

In some optional embodiments of this application, when an object (for example, a human face) is approaching the electronic device 100, the optical proximity sensor 106F senses that an object is approaching the electronic device 100, and sends, to the processor 101 of the electronic device 100, a signal indicating that an object is approaching.

The fingerprint sensor 106G is configured to capture a fingerprint. The electronic device 100 may use a feature of the collected fingerprint to implement fingerprint-based unlocking, application lock access, fingerprint-based photographing, fingerprint-based call answering, and the like.

The button 107 includes a power button, a volume button, and the like. The button 107 may be a mechanical button or a touch button. The electronic device 100 may receive button input, and generate button signal input related to user settings and function control of the electronic device 100.

A software system of the electronic device 100 may use a layered architecture, an event-driven architecture, a micro-kernel architecture, a micro service architecture, or a cloud architecture. In the embodiments of the present disclosure, an Android system with a layered architecture is used as an example to illustrate a software structure of the electronic device 100.

Figure 2B:
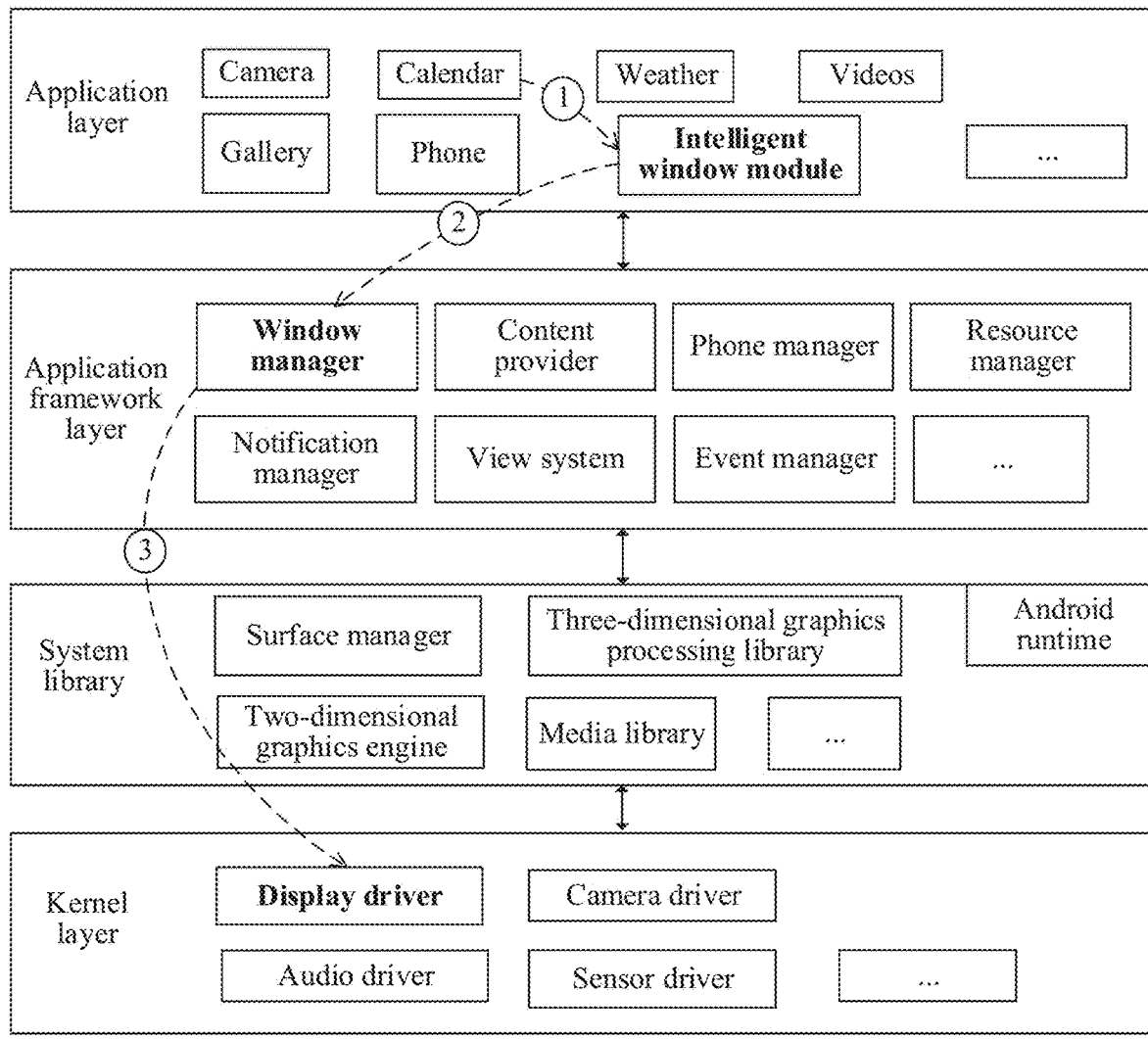
FIG. 2B is a schematic diagram of a software structure of an electronic device 100 according to an embodiment of this application.

FIG. 2B is a block diagram of a software structure of an electronic device 100 according to an embodiment of the present disclosure.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2B, the application packages may include applications such as Camera, Gallery, Calendar, Phone, Maps, Navigation, WLAN, Bluetooth, Music, Videos, and Messages. (An intelligent window module may be included, where the intelligent window module provides an application programming interface, and an airline application calls the application programming interface to display reminder information in an intelligent window.)

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, an event manager, and the like.

In the embodiments of this application, an intelligent window module may be further added to the application layer. The intelligent window module is configured to: when a preset condition is met, display a floating window on an interface of another application on the electronic device or on a lock screen interface of the electronic device, and display reminder information and/or provide an entrance to the another application.

The window manager is configured to manage a window application. The window manager may obtain a size of a display screen, determine whether there is a status bar, perform screen locking, take a screenshot, and the like.

The content provider is configured to store and obtain data, and enable the data to be accessed by an application. The data may include a video, an image, audio, calls that are made and answered, a browsing history, a bookmark, an address book, and the like.

The view system includes visual controls, such as a control for displaying a text and a control for displaying a picture. The view system may be configured to construct an application. A display interface may include one or more views. For example, a display interface including a message notification icon may include a text display view and a picture display view.

The phone manager is configured to provide a communication function for the electronic device 100, for example, management of a call status (including answering, hanging up, or the like).

The resource manager provides, for an application, various resources such as a localized character string, an icon, a picture, a layout file, and a video file.

The notification manager enables the application to display notification information in the status bar, and may be configured to transmit a notification-type message. The message may automatically disappear after a short stay without user interaction. For example, the notification manager is configured to notify download completion or provide a message notification. The notification manager may alternatively be a notification that appears in a top status bar of the system in a form of a graph or a scroll bar text, for example, a notification for an application running in the background, or may be a notification that appears on the screen in a form of a dialog window. For example, text information is prompted in the status bar, a prompt tone is played, the electronic device vibrates, or an indicator blinks. For example, in some embodiments of this application, when the electronic device displays an intelligent window, the electronic device makes a motor vibrate or makes an indicator blink to prompt the user.

The event manager may be configured to: when the electronic device displays an intelligent window, receive a touch operation performed by the user, obtain coordinates of the touch operation performed by the user, and upload an event of the touch operation to the application layer.

The Android runtime includes a kernel library and a virtual machine. The Android runtime is responsible for scheduling and managing the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of common audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing. The kernel layer is a layer between hardware and software. The kernel layer includes at least a display driver, a camera driver, an audio driver, and a sensor driver.

The following describes an example of an operating process of software and hardware of the electronic device 100 with reference to an intelligent window scenario.

When the touch sensor 106D receives a touch operation for changing a status of the intelligent window, a corresponding hardware interrupt is sent to the kernel layer. The kernel layer processes the touch operation into an original input event (including information such as touch coordinates and a timestamp of the touch operation). The original input event is stored at the kernel layer. The window manager at the application framework layer may obtain the original input event from the kernel layer, and recognize a window management object corresponding to the input event, namely, an interface corresponding to the input event, so as to adjust a display status of an intelligent window.

The following describes an example of an operating process of software of the electronic device 100 with reference to a scenario in which an intelligent window is displayed when a preset condition is met.

In the embodiments of this application, the intelligent window module may call an API interface of a calendar application from the application framework layer to obtain holiday information of the calendar application. The intelligent window module determines whether the holiday information is preset target information. If the holiday information is the preset target information, the intelligent window module notifies the window manager at the application framework layer, and the window manager may call the display driver at the kernel layer to drive the display screen to display an intelligent window.

The following describes a display process, display duration, and a display method for an intelligent window in the embodiments of this application by using an airport scenario as an example.

In an information display method provided in this application, an electronic device displays a desktop or a user interface of an application A. When determining that a preset condition A is met, the electronic device displays an intelligent window corresponding to the preset condition A, and displays reminder information corresponding to the preset condition A in the intelligent window. After display duration of the intelligent window 314 elapses, the electronic device hides and no longer displays the intelligent window.

The preset condition A may be a condition preset by a user, or may be a default condition on the electronic device. For example, the preset condition A may be that the electronic device arrives at a target area M, time on the electronic device is target time T, target information E is obtained, or a change of the target information E is learned. This is not limited herein.

The reminder information corresponding to the preset condition may be generated by the electronic device based on the preset condition, or may be target information obtained by the electronic device, or may be preset by the user or a factory setting of the electronic device. This is not limited herein. That the electronic device displays an intelligent window when a preset condition is met is described below by using an example in which a user interface displayed on the electronic device is a user interface of a video application.

FIG. 3A-1 in FIG. 3A describes an example user interface 310 of a video application on an electronic device 100. As shown in FIG. 3A, the user interface 310 includes: a status bar 311, a display area 312, and a navigation bar 313.

The status bar 311 may include one or more signal strength indicators for a mobile communication signal, a battery status indicator, and a time indicator.

The display area 312 may be used for displaying short video content. The display area 312 includes a favorites control 312a, a comment control 312b, a forwarding control 312c, and an information display window 312d. The electronic device 100 detects a touch operation performed on the favorites control 312c in the video display area 312, and in response to the operation, the electronic device 100 may add currently played video content to favorites. The electronic device 100 detects a touch operation performed on the comment control 312b (for example, a tap operation performed on the comment control 312b) in the video display area 312, and in response to the operation, the electronic device 100 may display a comment input window, so that a user can enter a comment on the short video content in the input window. The electronic device 100 detects a touch operation performed on the forwarding control 312c (for example, a tap operation performed on the forwarding control 312c) in the video display area 312, and in response to the operation, the electronic device 100 may forward the current short video content. The information display window 312d is used for displaying a city logo and description information of the short video content.

The navigation bar 313 may include system navigation buttons such as a back button 313A, a home screen button 313B, and a task history callout button 313C. The home screen is an interface displayed after the electronic device 100 detects, on any user interface, a user operation performed on the home screen button 313B. When detecting that the user taps the back button 313A, the electronic device 100 may display a previous user interface of a current user interface. When detecting that the user taps the home screen button 313B, the electronic device 100 may display the home screen. When detecting that the user taps the task history callout button 313C, the electronic device 100 may display a task recently opened by the user. Each navigation button may have another name. This is not limited in this application. Each navigation button in the navigation bar 313 may alternatively be implemented as a physical button in addition to a virtual button.

In this application, when the reminder information corresponding to the preset condition A is displayed in the intelligent window 314, the reminder information may include one or more pieces of reminder information.

Case 1: There is one piece of reminder information, and the reminder information is displayed in the intelligent window within display duration.

For example, the preset condition A is that the electronic device arrives at an airport. As shown in FIG. 3A-2 in FIG. 3A, the electronic device displays the user interface 310 when the user is watching a short video. When the electronic device 100 detects that a location address of the electronic device 100 is the airport, the electronic device 100 displays the intelligent window 314 on the user interface 310. The intelligent window 314 is displayed in a capsule form, and the electronic device 100 obtains reminder information corresponding to the arrival at the airport. As shown in FIG. 3A-2 in FIG. 3A, obtained reminder information is "View the electronic boarding pass", and reminder information in the intelligent window 314 is "View the electronic boarding pass", to prompt the user to view flight information. After the intelligent window 314 is displayed for 5 seconds, the electronic device 100 no longer displays the intelligent window 314 on the video interface.

The electronic device 100 may obtain positioning information of the electronic device through the global positioning system (GPS). Alternatively, the electronic device 100 may obtain a geographic location of the electronic device and a city log through a sensorhub. The sensorhub mainly provides a low-power connection, processes data that comes from various sensor devices, for example, data of sensors such as an accelerometer or a gyroscope, and performs fusion on the data of the sensors. A positioning method is not limited in this application.

Figure 3B:
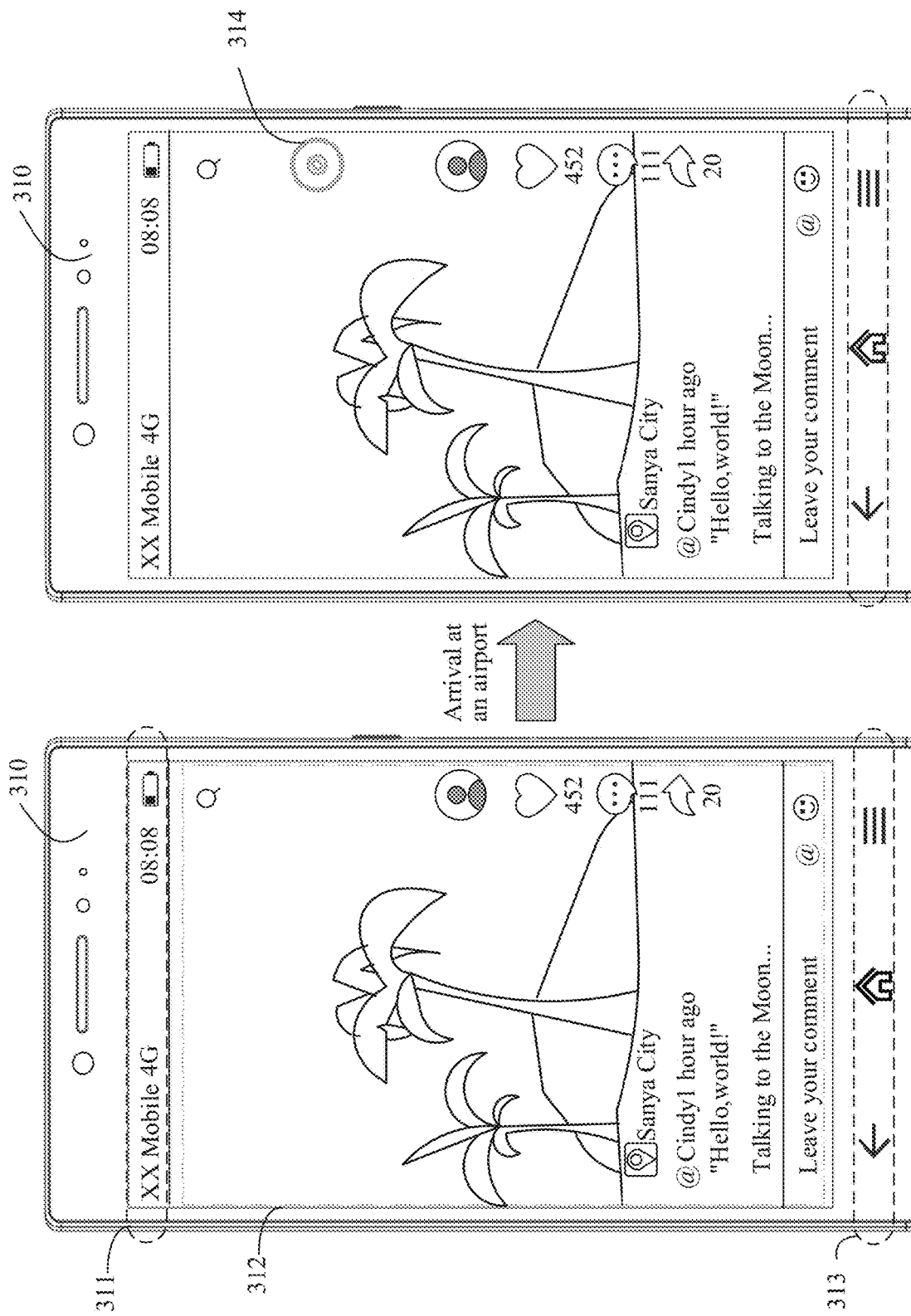

In some optional embodiments, the intelligent window 314 may alternatively be in a circular form. The circular form occupies a smaller display area of the current user interface, without blocking the current user interface. As shown in FIG. 3B, when the electronic device 100 detects that a location address of the electronic device 100 is the airport, the electronic device 100 may alternatively display a circular intelligent window on the video interface. The circular intelligent window 314 does not display information. When the user needs to view information in the intelligent window 314, the user may tap the intelligent window 314, the intelligent window 314 may be displayed in a capsule form, and reminder information is displayed in the intelligent window 314. For example, "View the boarding pass" shown in FIG. 3A-2 in FIG. 3A may be displayed.

Figure 3C:
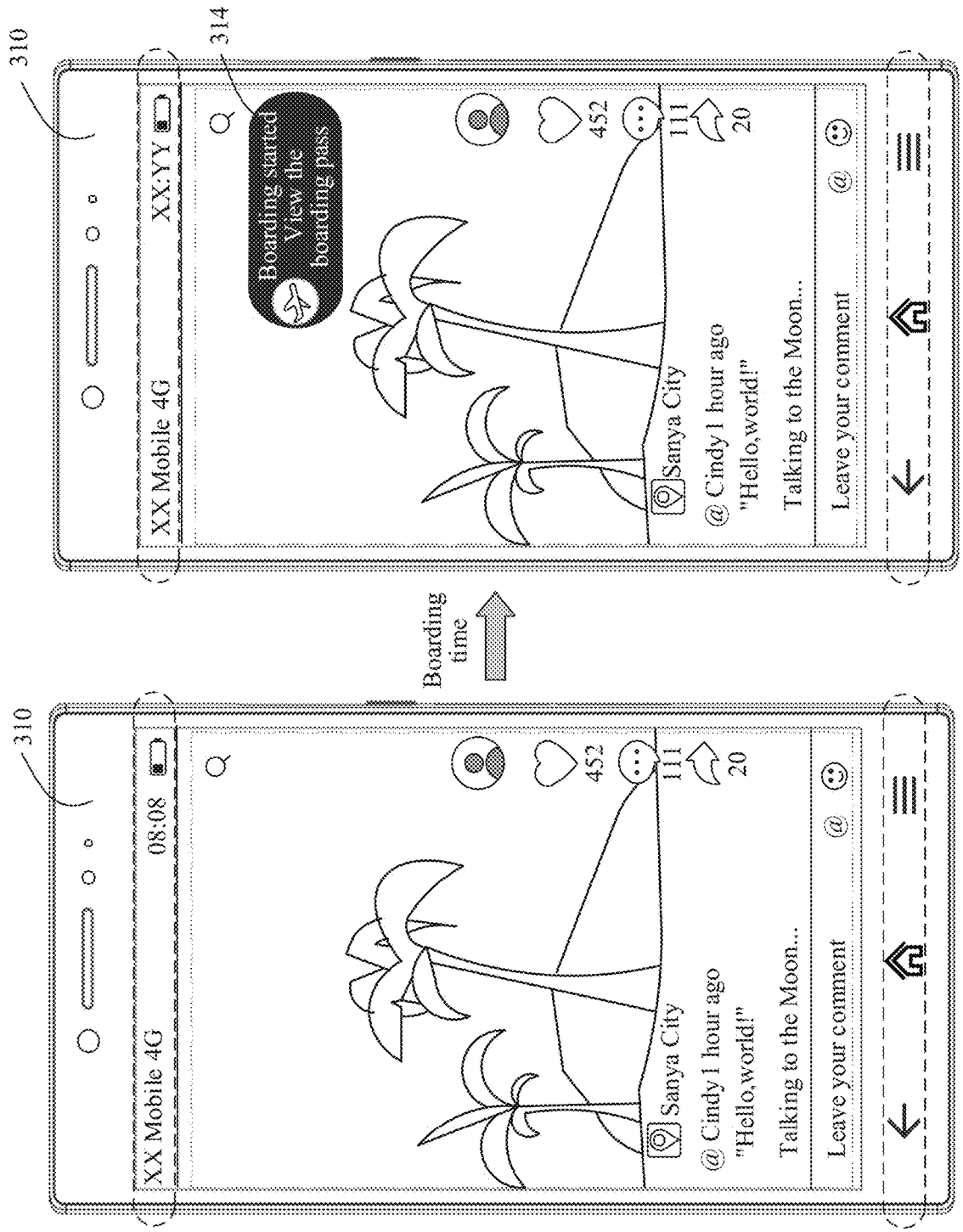

For example, the preset condition A is that the electronic device detects that time is 3 p.m. As shown in FIG. 3C, the electronic device displays the user interface 310 when the user is watching a short video. The electronic device learns that boarding time information is 4 p.m. The electronic device may prompt the user to board one hour in advance, to prevent the user from missing the boarding. When the electronic device detects that current time is 3 p.m., the electronic device displays the intelligent window 314 on the user interface 310, the electronic device 100 obtains reminder information "Boarding started" corresponding to the boarding time scenario, and reminder information corresponding to the boarding time is displayed in the intelligent window 314. As shown in FIG. 3C, the text "Boarding started" is displayed in the intelligent window. After the intelligent window 314 is displayed for 20 seconds, the electronic device 100 no longer displays the intelligent window 314 on the video interface.

For example, the preset condition A is that the electronic device obtains gate information. As shown in FIG. 3D(1), FIG. 3D(2), and FIG. 3D(3), the electronic device displays the user interface 310, the electronic device 100 obtains the gate information, the electronic device 100 displays the intelligent window 314 on the user interface 310, and reminder information corresponding to the gate information is displayed in the intelligent window 314. In this case, the reminder information is the gate information. For example, as shown in FIG. 3D(1), FIG. 3D(2), and FIG. 3D(3), the text "Gate 52K" is displayed in the intelligent window. The intelligent window 314 is always displayed on the video interface.

For example, the preset condition A is that the electronic device learns of a change of gate information. As shown in FIG. 3D(1), FIG. 3D(2), and FIG. 3D(3), the reminder information "Gate 52K" is displayed in the intelligent window 314. The electronic device 100 obtains new gate information, and reminder information corresponding to the new gate information is displayed in the intelligent window 314. In this case, the reminder information changes from Gate 52K to Gate 68K. As shown in FIG. 3D(1), FIG. 3D(2), and FIG. 3D(3), the text "Gate 68K" is displayed in the intelligent window. In this way, the gate information can be displayed in the intelligent window in real time. When the gate information changes, updated gate information can be displayed in the intelligent window, and the user does not need to start an airline application to view the gate information. This is convenient.

In some embodiments, when the reminder information obtained by the electronic device 100 is the gate information, display duration of the intelligent window 314 is 30 seconds, and after the intelligent window 314 is displayed for 30 seconds, the electronic device 100 no longer displays the intelligent window 314 on the video interface. When the electronic device 100 learns of a change of the gate information, the electronic device 100 may re-display the intelligent window 314, and display new gate information in the intelligent window 314. After the intelligent window 314 is displayed for 30 seconds, the electronic device 100 no longer displays the intelligent window 314 on the video interface.

The foregoing reminder information displayed in intelligent window 314 is merely an example for description. In actual application, the reminder information may alternatively be other information. This is not limited in this application.

In some optional embodiments, within display duration T2 of the intelligent window, when the user considers that the intelligent window does not need to be displayed for such a long period of time, the electronic device may receive a second user operation of collapsing the intelligent window, and in response to the second user operation, the intelligent window switches to a circular form, and no reminder information is displayed in the intelligent window. For example, the electronic device 100 displays the reminder information "Gate 52K", and display duration of an intelligent window corresponding to the reminder information is long-time display. When the user has learned of the reminder information and considers that the intelligent window no longer needs to be displayed on the video interface, the user may swipe to collapse the intelligent window to a circular form. The circular intelligent window can occupy a smaller display area, without blocking content on the current user interface.

The second user operation may be a touch operation, for example, a single-tap, double-tap, touch-and-hold, or swipe operation.

Figure 4:
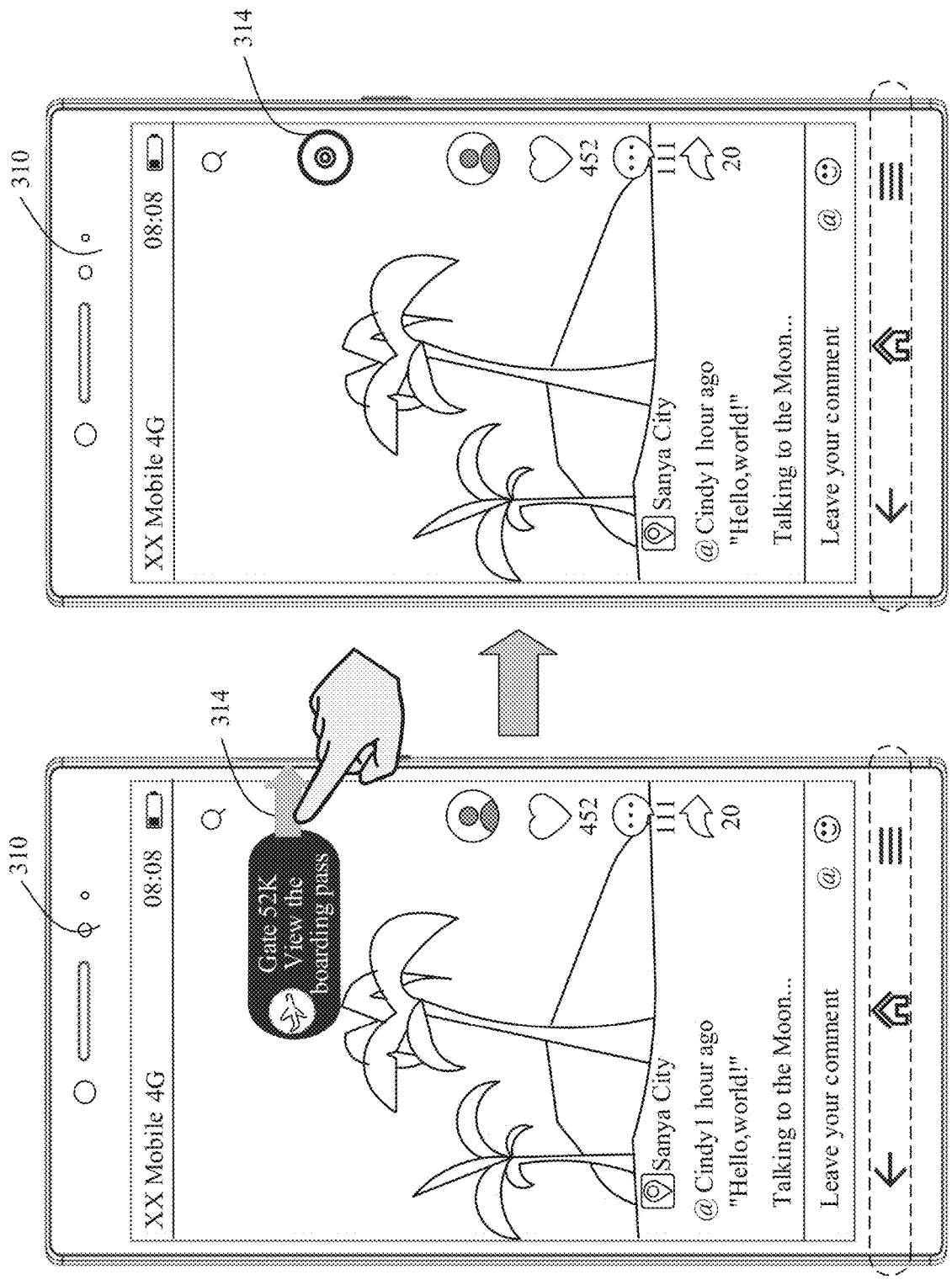
FIG. 4 shows that an electronic device hides and no longer displays an intelligent window after duration in which prompt information is displayed in the intelligent window reaches display duration T1 according to an embodiment of this application.

For example, as shown in FIG. 4, the second user operation may be that a distance by which a finger of the user swipes to the right on the display screen 109 reaches a first distance threshold, and the intelligent window is displayed in a circular form. In addition to the swiping to the right, the second user operation may alternatively be that a distance by which a finger of the user swipes to the left on the display screen 109 reaches a second distance threshold, and the intelligent window is displayed in a circular form.

In some embodiments, the user may alternatively swipe on the display screen 109 through another body part or a tool, to move the intelligent window. For example, the user may drag the intelligent window through a fingertip, a finger pulp, an elbow, or a stylus. This is not limited herein.

In addition to the foregoing swipe operation performed by the user, the second user operation may alternatively be performed through voice control, gesture control, button control, or the like. For specific related descriptions, refer to related descriptions of a first user operation. Details are not described herein again.

Figure 3E:
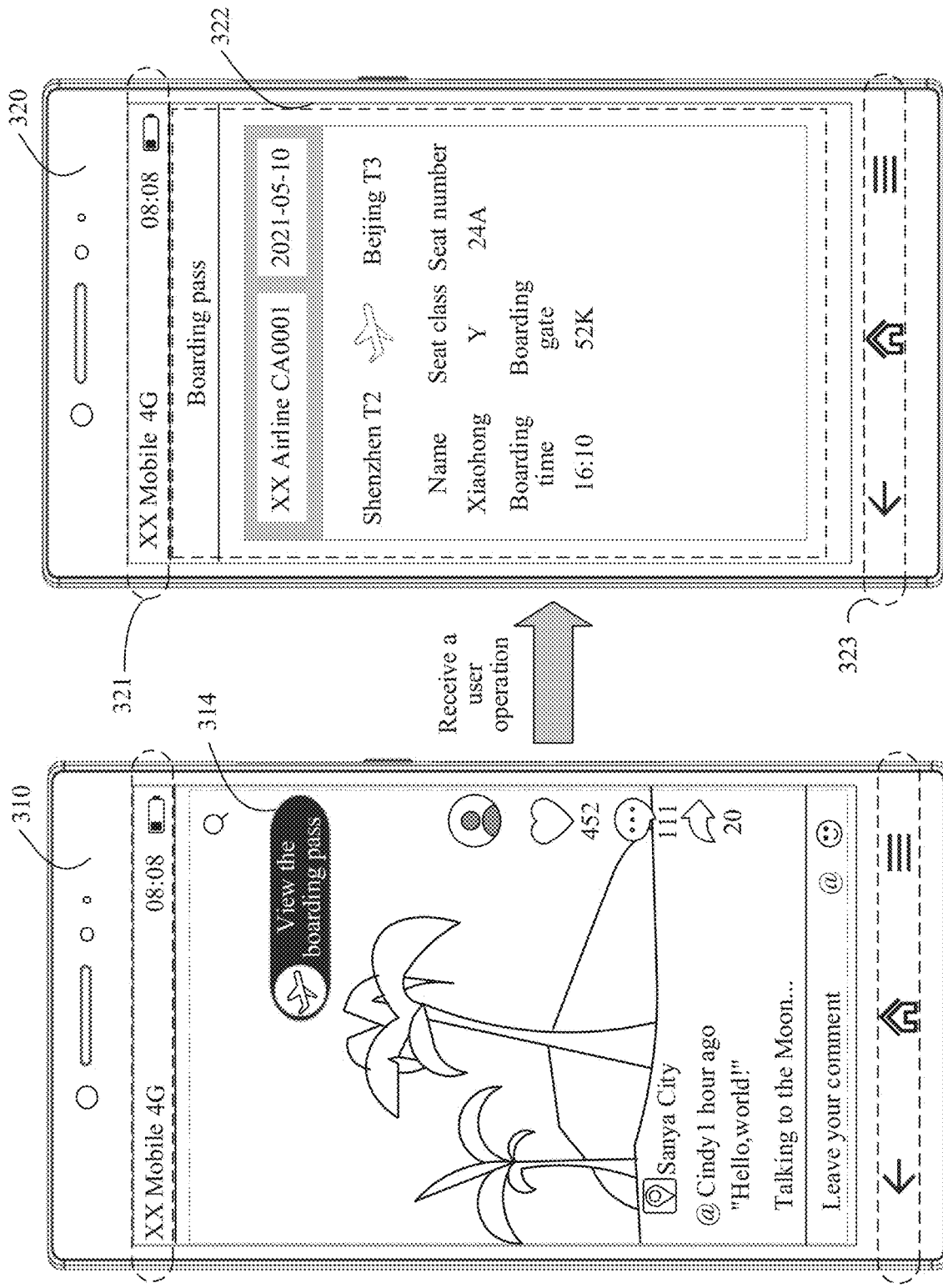
FIG. 3E is a schematic diagram of a user interface of an electronic device 100 according to an embodiment of this application.

In some optional embodiments, as shown in FIG. 3E, the electronic device 100 displays the intelligent window 314 on the user interface 310, and the reminder information "View the boarding pass" is displayed in the intelligent window 314. When the customer needs to view the boarding pass, the electronic device 100 may receive the first user operation performed on the intelligent window 314, and the electronic device 100 displays a user interface 320 in response to the first user operation. The user interface 320 is a boarding pass interface. As shown in FIG. 3E, the user interface 320 includes a status bar 321, a boarding pass information display area 322, and a navigation bar 323.

The status bar 321 is the same as the status bar 311 on the user interface 310. Details are not described herein again.

The navigation bar 323 is the same as the navigation bar 313 on the user interface 310. Details are not described herein again.

The boarding pass information display area 322 is used for displaying flight information of the user. For example, the flight information may include a flight number, a departure terminal, a name, a seat number, boarding time, and a gate.

It should be noted that the user interface 320 may be provided by an airline application. For example, the intelligent window module calls an API interface of the airline application to display a user interface of the airline application. The user interface 320 may alternatively be generated by the electronic device 100 based on obtained flight information. This is not limited herein.

The first user operation may be a touch action performed on the intelligent window 314 (for example, a tap operation performed on the intelligent window 314), and the electronic device 100 displays the user interface 320 in response to the touch operation. The touch operation may be tap, double-tap, touch-and-hold, or the like. In addition to the touch operation, the first user operation may alternatively be a voice command, a floating operation, or the like. This is not limited in this application.

The following describes rules for determining display duration of an intelligent window and displaying reminder information by using examples.

The electronic device displays reminder information corresponding to a preset condition in an intelligent window, and the intelligent window adjusts display duration T1 of the intelligent window based on importance of the reminder information. The display duration T1 of the intelligent window is duration of the reminder information. The intelligent window always displays the reminder information within the display duration. For different reminder information, the intelligent window is displayed for different duration.

The importance of the reminder information corresponding to the preset condition may be divided into a plurality of levels. For example, the importance may be divided into three levels: minor, important, and critical.

The electronic device 100 stores a correspondence table 1 between a preset condition, reminder information, importance, and display duration. When the electronic device meets a preset condition, the electronic device performs matching against the correspondence table 1 to obtain importance of reminder information and corresponding display duration of an intelligent window.

For example, the correspondence may be shown in Table 1.

TABLE 1

| Condition for triggering displaying of an intelligent window | Reminder information | Importance | Display duration of the intelligent window |
|---|---|---|---|
| Arrival at an airport | View the boarding pass | Minor | 5 seconds |
| Boarding started | Boarding started | Important | 20 seconds |
| Gate confirmation/ Gate change | Gate information | Critical | 30 seconds/Long-time display |

It can be understood that the foregoing table is merely an example for indicating the correspondence between a condition for triggering displaying of an intelligent window, reminder information, importance, and display duration. In actual application, text content and a storage mode of the correspondence may alternatively be in other forms. This is not specifically limited herein.

In addition to dividing the importance into the three levels, in actual implementation, the importance may alternatively be divided into four levels, 10 levels, or the like. This is not limited herein. Levels of importance and a correspondence between reminder information and importance may be preset by the user, or may be a factory setting of the electronic device. This is not limited herein.

According to Table 1, it can be learned that importance corresponding to the three pieces of reminder information, namely, "View the boarding pass", "Boarding started", and gate information, is minor, important, and critical respectively; and display duration corresponding to the three pieces of reminder information is display duration of 5 seconds, display duration of 20 seconds, and display duration of 30 seconds respectively. Therefore, the gate information has highest importance, the gate information has longest display duration, importance of "Boarding started" is slightly lower than that of the gate information, display duration of "Boarding started" is shorter than that of the gate information, "View the boarding pass" has lowest importance, and "View the boarding pass" corresponds to shortest display duration.

It can be understood that, in the embodiments of this application, display duration corresponding to importance may be preset by the user, or may be a factory setting of the electronic device. This is not limited in this application.

For example, when the reminder information "View the boarding pass" is displayed in the intelligent window 314, importance corresponding to the reminder information is minor, and therefore display duration of the intelligent window 314 is 5 seconds. When the reminder information "Boarding started" is displayed in the intelligent Window 314, importance corresponding to the reminder information is important, and display duration of the intelligent window 314 is 20 seconds. When the reminder information "Gate 52K" is displayed in the intelligent window 314, importance corresponding to the reminder information is critical, and display duration of the intelligent window 314 is 30 seconds or long-time display. In this way, reminder information with higher importance corresponds to longer display duration to prevent the user from missing important information, and reminder information with lower importance may be displayed for a shorter time to avoid interference to the user.

Case 2: There are a plurality of pieces of reminder information, and the plurality of pieces of reminder information are displayed in the intelligent window within display duration.

When a plurality of reminders are displayed in the intelligent window, a plurality of pieces of reminder information may be alternately displayed in the intelligent window. The electronic device determines display duration T2 based on the plurality of pieces of reminder information. Within the display duration T2 of the intelligent window, the electronic device determines a display order and display duration of the plurality of pieces of reminder information in the intelligent window based on importance of the plurality of pieces of reminder information. After the display duration T2 of the intelligent window 314 elapses, the electronic device 100 hides and no longer displays the intelligent window 314.

The display duration T2 of the intelligent window may include n alternate display periods, and duration of one alternate display period is t1. Therefore, n×t1=T2, and each piece of reminder information is displayed once within one alternate display period. Within one alternate display period, display duration of all reminder information may be the same or different. For example, as shown in FIG. 5A(1) and FIG. 5A(2), the electronic device obtains two pieces of reminder information: "Boarding started" and "Gate 52K". It can be learned from Table 1 that intelligent window display duration corresponding to the reminder information "Boarding started" is 20 seconds, and intelligent window display duration corresponding to the reminder information "Gate 52K" is 30 seconds. Therefore, it can be determined that the display duration of the intelligent window is 30 seconds. The display duration of the intelligent window, namely, 30 seconds, include six alternate display periods. Within one alternate display period of 5 seconds, each piece of reminder information is displayed for 2.5 seconds. To be specific, "Gate 52K" is displayed in the $1^{st}$ 2.5 seconds, "Boarding started" is displayed in the $2^{nd}$ 2.5 seconds, "Gate 52K" is displayed in the $3^{rd}$ 2.5 seconds, and "Boarding started" is displayed in the 4th 2.5 seconds. In this way, the two pieces of reminder information, namely, "Boarding started" and "Gate 52K", are alternately displayed until the display duration of the intelligent window, namely, 30 seconds, elapses, and the electronic device no longer displays the intelligent window. In this way, the two pieces of reminder information, namely, "Boarding started" and "Gate 52K", are alternately displayed within the display duration of the intelligent window, so that a plurality of pieces of reminder information can be displayed in limited space.

For example, as shown in FIG. 5B(1) and FIG. 5B(2), the display duration of the intelligent window, namely, 30 seconds, includes four alternate display periods. Within one alternate display period, display duration of reminder information is different. Within one alternate display period of 7.5 seconds, "Gate 52K" is displayed for 5 seconds, and "Boarding started" is displayed for 2.5 seconds. To be specific, within the display duration of the intelligent window, namely, 30 seconds, "Gate 52K" is displayed at the 0th second to the $2.5^{th}$ second, "Boarding started" is displayed at the $2.5^{th}$ second to the $7.5^{th}$ second, "Boarding started" is displayed at the $7.5^{th}$ second to the $12.5^{th}$ second, and "Gate 52K" is displayed at the 12.5th second to the 15th second. In this way, the two pieces of reminder information, namely, "Boarding started" and "Gate 52K" are alternately displayed until the display duration of the intelligent window, namely, 30 seconds, elapses, and the electronic device no longer displays the intelligent window.

Figure 6A:
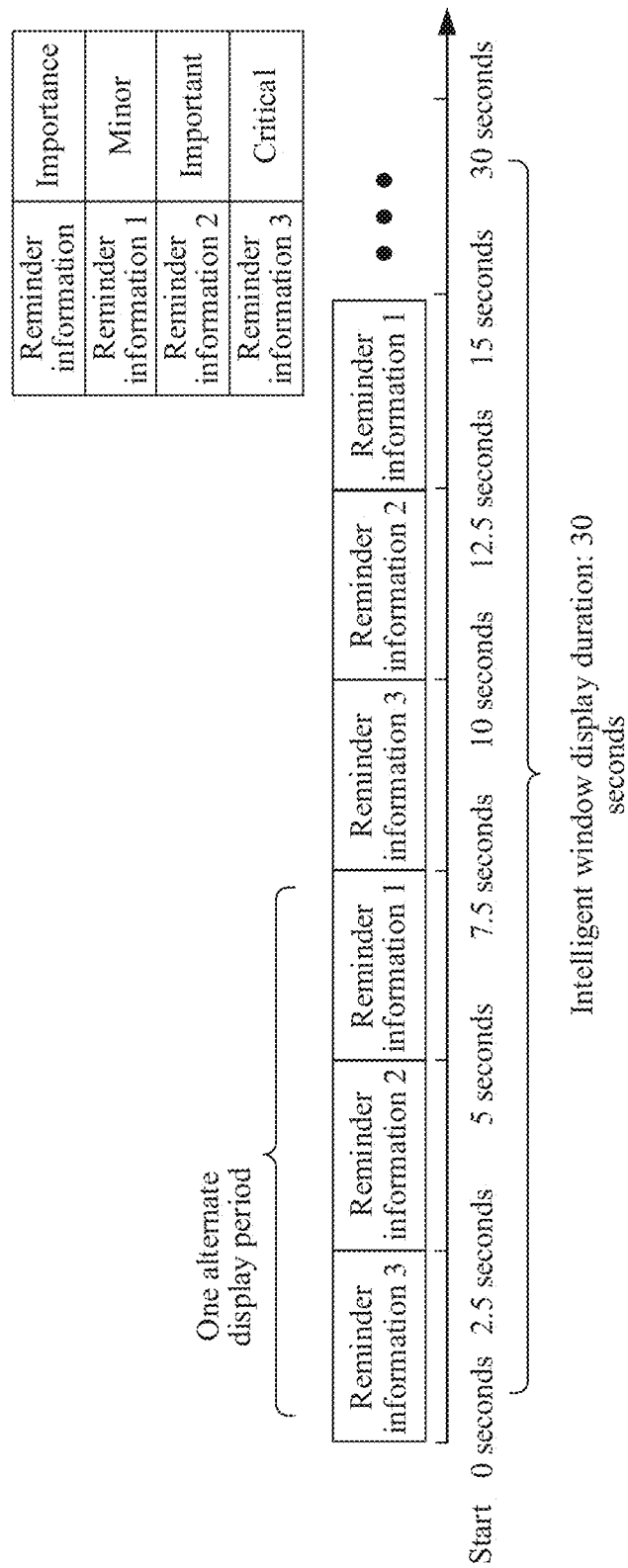
FIG. 6A to FIG. 6C show that an intelligent window determines a display mode for a plurality of pieces of prompt information within display duration T2 of the intelligent window according to an embodiment of this application.
Figure 6B:
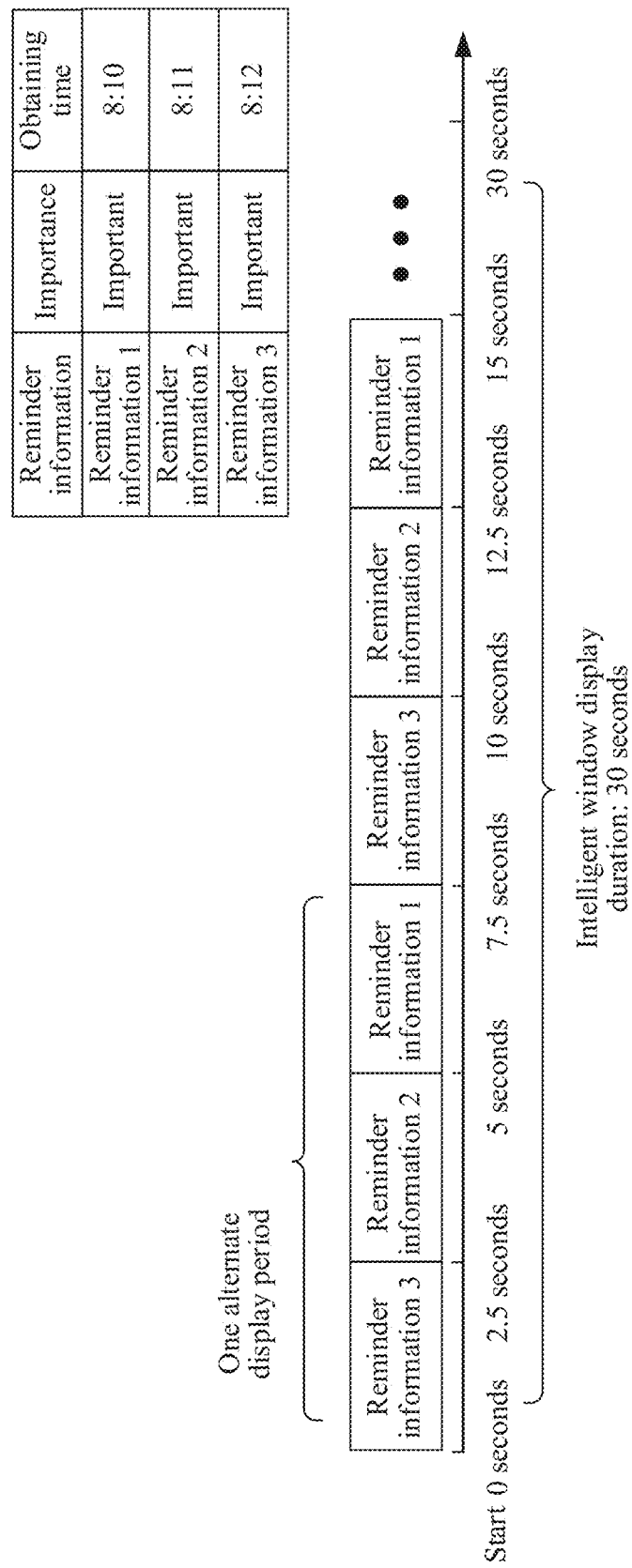
Figure 6C:
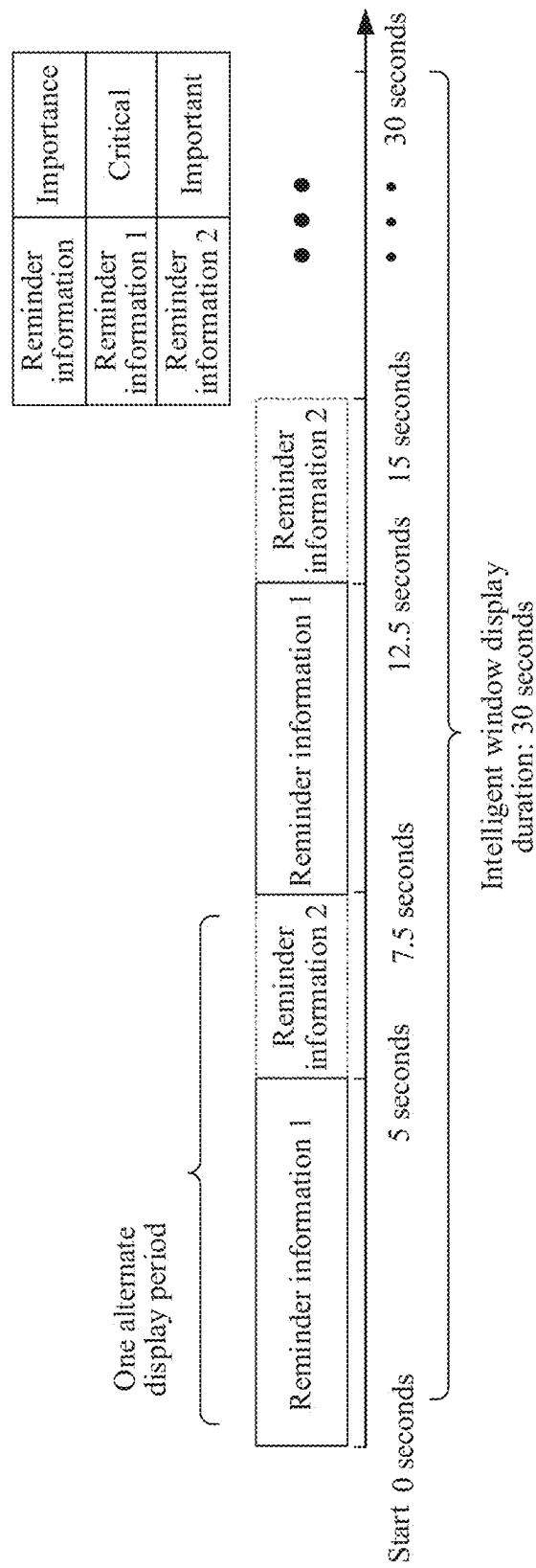

With reference to FIG. 6A to FIG. 6C, the following describes rules for determining display duration of an intelligent window and determining display modes for a plurality of pieces of reminder information by using examples.

(1) The intelligent window determines display duration T2 based on the plurality of pieces of reminder information.

When a plurality of pieces of reminder information are displayed in the intelligent window, the electronic device may determine the display duration T2 of the intelligent window based on a quantity of reminder information, or may determine the display duration T2 of the intelligent window based on importance matching the plurality of pieces of reminder information, or may determine the display duration T2 of the intelligent window jointly based on a quantity of reminder information and importance corresponding to each of the plurality of pieces of reminder information.

Specifically, the following three cases are included.

Case 1: The display duration of the intelligent window is determined based on a quantity of reminder information.

It is assumed that there are M pieces of reminder information, and each piece of reminder information corresponds to unit display duration. When M is less than or equal to a first value N, it can be determined that the display duration of the intelligent window is duration t3, where the duration t3 is display duration corresponding to lowest importance.

When M is greater than the first value N, it can be determined that the display duration of the intelligent window is the unit display duration×M.

For example, display duration corresponding to each piece of reminder information is 2.5 seconds. To be specific, when the quantity of reminder information is 1, the display duration of the intelligent window is 2.5 seconds; or when the quantity of reminder information is 2, the display duration of the intelligent window is 5 seconds. Each time the quantity of reminder information increases by 1 subsequently, the display duration of the intelligent window increases by 2.5 seconds. It can be learned from the foregoing Table 1 that minimum display duration of the intelligent window is 5 seconds. Therefore, even if there is one piece of reminder information, the intelligent window is still displayed for 5 seconds.

For example, a correspondence between a quantity of reminder information and display duration may be shown in Table 2.

TABLE 2

| Quantity of reminder information | Display duration of the intelligent window |
|---|---|
| 1 to 2 | 5 seconds |
| 3 | 7.5 seconds |
| 4 | 10 seconds |
| 5 | 12.5 seconds |
| 6 | 15 seconds |

It can be understood that the foregoing table is merely an example for indicating the correspondence between a quantity of reminder information and display duration. In actual application, text content of the correspondence may alternatively be in another form. This is not specifically limited herein.

Case 2: The display duration of the intelligent window is determined based on importance of a plurality of pieces of reminder information.

Each reminder corresponds to one piece of display duration, and a plurality of pieces of reminder information respectively correspond to a plurality of pieces of display duration. Therefore, when a preset condition corresponds to a plurality of pieces of reminder information, a longest one of a plurality of pieces of display duration corresponding to the plurality of pieces of reminder information is used as final display duration of the intelligent window. For example, there are reminder information 1, reminder information 2, and reminder information 3, display duration corresponding to the reminder information 1 is 5 seconds, display duration corresponding to the reminder information 2 is 10 seconds, and display duration corresponding to the reminder information 3 is 30 seconds. A longest one of the 5 seconds, the 10 seconds, and the 30 seconds is used as the display duration of the intelligent window. Therefore, it can be determined that the display duration of the intelligent window is 30 seconds.

For example, in FIG. 5A(1) and FIG. 5A(2), when the boarding information "Boarding started" and "Gate 52K" are alternately displayed in the intelligent window, it can be learned from Table 1 that display duration corresponding to the reminder information "Boarding started" is 10 seconds, and display duration corresponding to "Gate 52K" is 30 seconds. Therefore, it can be determined that the display duration of the intelligent window is 30 seconds.

Case 3: The display duration of the intelligent window is determined jointly based on a quantity of reminder information and importance of reminder information.

It can be learned from the analysis in Case 1 and Case 2 that the electronic device may determine display duration t5 based on a quantity of reminder information, and the electronic device may determine display duration t6 based on importance of reminder information. The electronic device may compare a length of the display duration t5 with a length of the display duration t6, and use a longer one of the display duration t5 and the display duration t6 as final display duration of the intelligent window.

For example, in FIG. 5A(1) and FIG. 5A(2), the reminder information "Boarding started" and "Gate 52K" are displayed, intelligent window display duration corresponding to the reminder information "Boarding started" is 20 seconds, and intelligent window display duration corresponding to the reminder information "Gate 52K" is 30 seconds. Based on importance of the reminder information, it can be determined that the display duration of the intelligent window is 30 seconds. Assuming that each piece of information is displayed for 2.5 seconds, based on the quantity of reminder information, it can be learned that the display duration of the intelligent window is 5 seconds. The duration of 30 seconds is longer than the duration of 5 seconds. Therefore, the final display duration of the intelligent window is 30 seconds.

In some optional embodiments, when a preset scenario corresponds to a plurality of pieces of reminder information, each reminder corresponds to one piece of display duration, and the display duration of the intelligent window may be a sum of display duration corresponding to the plurality of pieces of reminder information. For example, there are reminder information 1, reminder information 2, and reminder information 3, display duration corresponding to the reminder information 1 is 5 seconds, display duration corresponding to the reminder information 2 is 10 seconds, and display duration corresponding to the reminder information 3 is 30 seconds. Therefore, it can be determined that the display duration of the intelligent window is 45 seconds.

(2) A plurality of pieces of information may be alternately displayed in the intelligent window within the display duration T2 of the intelligent window.

Within the display duration T2 of the intelligent window, the intelligent window determines a display order and display duration of the plurality of pieces of reminder information based on importance of the plurality of pieces of reminder information.

Specifically, the following three cases may be included.

Case 1: When a plurality of pieces of reminder information are alternately displayed in the intelligent window, display duration of all reminder information is the same. A display order of the reminder information is determined based on importance of the reminder information. Within one alternate period, reminder information with higher importance is displayed before reminder information with lower importance.

Importance of the plurality of pieces of reminder information varies.

For example, it is assumed that there are three pieces of reminder information: reminder information 1, reminder information 2, and reminder information 3. Intelligent window display duration corresponding to the three pieces of reminder information is 30 seconds. Within one alternate display period, each pieces of reminder information is displayed for 2.5 seconds. The display duration of the intelligent window, namely, 30 seconds, include a total of four alternate display periods. As shown in FIG. 6A, importance corresponding to the reminder information 1, the reminder information 2, and the reminder information 3 is minor, important, and critical. In this case, within one alternate display period, the reminder information 3 with the importance of critical is displayed first, then the reminder information 2 with the importance of important is displayed, and finally the reminder information 1 with the importance of minor is displayed. To be specific, the reminder information 3 is displayed within the 1st 2.5 seconds, the reminder information 2 is displayed within the 2nd 2.5 seconds, and the reminder information 3 is displayed within the 3 rd 2.5 seconds.

For example, as shown in FIG. 5A(1) and FIG. 5A(2), the electronic device 100 obtains two reminders of gate information and boarding time information, and intelligent window display duration corresponding to the two pieces of reminder information is 30 seconds. It can be learned from Table 1 that importance of the gate information is higher than that of the boarding time information. In this case, within one alternate display period, "Gate 52K" is displayed before "Boarding started". When cumulative display duration of "Boarding started" and "Gate 52K" is 30 seconds, the intelligent window is removed from the user interface 310.

If importance of the plurality of pieces of reminder information is the same, a display order of the reminder information is determined based on time at which the reminder information is obtained.

For example, it is assumed that there are three pieces of reminder information: reminder information 1, reminder information 2, and reminder information 3. Importance corresponding to the three pieces of reminder information is the same. It this case, determining is performed on time at which the three pieces of reminder information are obtained. A display order of the reminder information is reverse to a chronological order in which the reminder information is obtained. To be specific, within one alternate display period, reminder information obtained first is displayed last, and reminder information obtained later is displayed earlier. As shown in FIG. 6B, the reminder information 1 is obtained at 8:10, the reminder information 2 is obtained at 8:11, and the reminder information 3 is obtained at 8:12. Within one alternate display period, the reminder information 3 is first displayed in the intelligent window, then the reminder information 2 is displayed, and finally the reminder information 1 is displayed.

Case 2: When a plurality of pieces of reminder information are displayed in the intelligent window, the plurality of pieces of reminder information correspond to a plurality of pieces of display duration. The electronic device determines the display duration of the reminder information based on importance of the reminder information. Within one period, display duration of reminder information with higher importance is longer, and display duration of reminder information with lower importance is shorter.

For example, as shown in FIG. 6C, it is assumed that there are two pieces of reminder information: reminder information 1 and reminder information 2. Importance corresponding to the reminder information 1 is critical, and importance corresponding to the reminder information 2 is important. Therefore, within one alternate display period, display duration of the reminder information 1 is longer than that of the reminder information 2. For example, one alternate display period is 7.5 seconds. In this case, the display duration of the reminder information 1 is 5 seconds, and the display duration of the reminder information 2 is 2.5 seconds.

For example, in FIG. 5B(1) and FIG. 5B(2), two reminders alternately displayed in the intelligent window are gate information and boarding time information. One display period for displaying the two pieces of reminder information is 7.5 seconds, and importance of the gate information is higher than that of the boarding time information. Therefore, the gate information is displayed for 5 seconds, and the boarding time information is displayed for 2.5 seconds.

Figure 7:
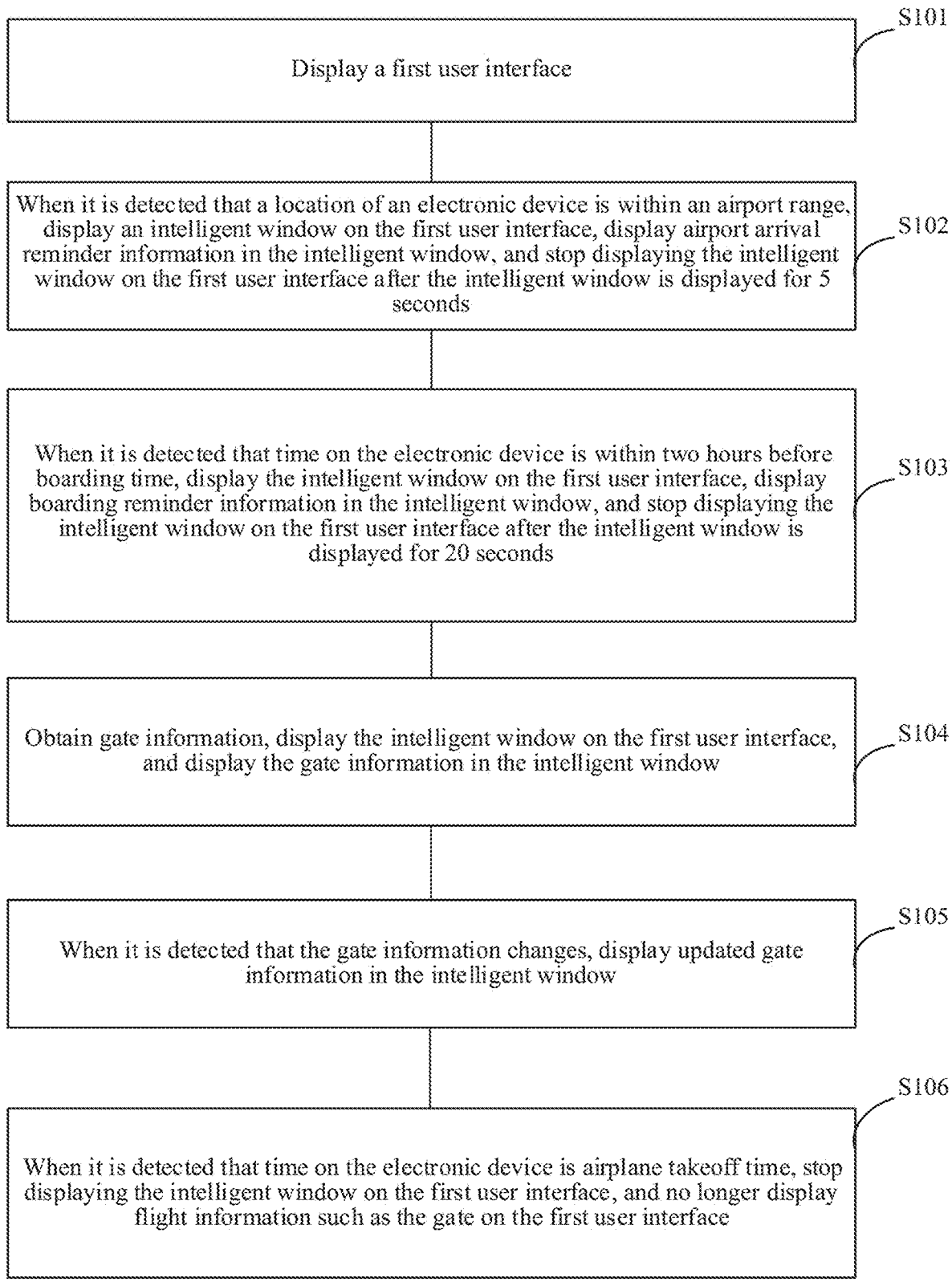
FIG. 7 is a schematic flowchart of a display method according to an embodiment of this application.

The following specifically describes a display method provided in the embodiments of this application with reference to FIG. 7. FIG. 7 is a schematic flowchart of an information display method according to an embodiment of this application.

In the information display method provided in this embodiment of this application, an electronic device 100 displays a first user interface, and when a first preset condition is met, the electronic device displays an intelligent window 314 on the first user interface. A reminder corresponding to the first preset condition may be displayed in the intelligent window 314. The electronic device may adjust display duration of the intelligent window and a display mode for reminder information based on a current scenario. After display duration of the intelligent window elapses, the electronic device hides and no longer displays the intelligent window.

The following provides descriptions by using the electronic device 100 as an execution entity. The information display method provided in this application is described by using an airport scenario as an example.

The electronic device displays the first user interface.

Specifically, the first user interface may be an interface on which a first application runs on the electronic device 100, or may be a home screen of the electronic device 100.

For example, the first user interface may be the user interface 310 provided in the embodiment of FIG. 3A. In addition to the foregoing user interface, in specific implementation, the first user interface may alternatively be another user interface. This is not limited in this application.

When it is detected that a location of the electronic device is within an airport range, an intelligent window including first reminder information is displayed on the first user interface. For example, the first reminder information is "View the boarding pass".

Specifically, the electronic device obtains positioning information of the electronic device at preset intervals, and when the electronic device detects that a location address is within the airport range, the electronic device displays an intelligent window on a current user interface. The electronic device obtains the first reminder information corresponding to an airport arrival scenario, and displays the corresponding first reminder information in the intelligent window. The first reminder information may be preset by a user, or may be a factory setting of the electronic device. For example, in the embodiment of FIG. 3A, the first reminder information may be "View the boarding pass".

For example, the electronic device detects that the location address is within the airport range, the electronic device searches Table 1 to match reminder information corresponding to the arrival at the airport, to obtain the reminder information corresponding to the arrival at the airport.

When display duration of the intelligent window reaches first duration, the electronic device stops displaying the intelligent window including the first reminder information on the first user interface.

FIG. 3A is used as an example. The first reminder information is "View the boarding pass". The electronic device checks a correspondence between the first reminder information, importance, and display duration, to obtain intelligent window display duration corresponding to the reminder information "View the boarding pass". For example, the electronic device may search Table 1 to find that importance corresponding to the reminder information "View the boarding pass" is minor, and corresponding intelligent window display duration is 5 seconds, so as to learn that the display duration of the intelligent window is 5 seconds. When the display duration of the intelligent window reaches 5 seconds, the electronic device no longer displays the intelligent window on a current user interface.

When it is detected that time on the electronic device is within first time away from boarding time, an intelligent window including a second reminder is displayed on the first user interface. For example, the second reminder information is "Boarding started".

The being within first time away from the boarding time may be being within one hour away from the boarding time, for example, being within one hour before the boarding time. The second reminder information corresponds to the boarding time, for example, may be "Boarding started" or "View the boarding pass" in FIG. 3B, or may be "Boarding started" and "View the boarding pass". This is not limited in this application.

In the embodiment of FIG. 3B, the electronic device learns that boarding time of the user is 4 p.m. The electronic device may prompt the user to board one hour in advance, to prevent the user from missing the boarding. When the electronic device detects that current time is 3 p.m., the electronic device displays the intelligent window 314 on a current user interface, and displays "Boarding started" and "View the boarding pass" in the intelligent window.

When display duration of the intelligent window reaches second duration, the electronic device stops displaying the intelligent window including the second reminder information on the first user interface.

FIG. 3B is used as an example. The second reminder information is "Boarding started". The electronic device checks a correspondence between the second reminder information, importance, and display duration, to obtain intelligent window display duration corresponding to the reminder information "Boarding started". For example, the electronic device may search Table 1 to find that importance corresponding to the reminder information "Boarding started" is critical, and corresponding intelligent window display duration is 20 seconds, so as to learn that the display duration of the intelligent window is 20 seconds. When the display duration of the intelligent window reaches 20 seconds, the electronic device no longer displays the intelligent window on a current user interface.

When gate information is obtained, the electronic device displays an intelligent window including the gate information on the first user interface.

Third reminder information is the gate information. For example, in the embodiment of FIG. 3C, the third reminder information is "Gate 52K".

Specifically, the electronic device obtains flight information at preset intervals, and when the electronic device obtains the gate information, the electronic device displays an intelligent window on a current user interface, and displays "Gate 52K" in the intelligent window.

When detecting that the gate information changes, the electronic device displays updated gate information in the intelligent window.

FIG. 3C is used as an example. The third reminder information displayed in the intelligent window is "Gate 52K". When the electronic device obtains new gate information "Gate 68K", the electronic device updates the third reminder information to "Gate 68K", displays "Gate 68K" in the intelligent window, and no longer displays "Gate 52K".

When a preset condition is met, the electronic device removes the intelligent window, and no longer displays the intelligent window on the first user interface.

The preset condition may be that an airplane takes off. For example, time on the electronic device is airplane takeoff time or 15 minutes before the airplane takeoff time. The preset condition may alternatively be that the user performs a swipe operation. For example, refer to a rightward swipe operation in FIG. 4. The preset condition may alternatively be that the display duration of the intelligent window reaches third duration. For example, after the intelligent window is displayed for 30 seconds, the intelligent window is no longer displayed.

It can be understood that, in this application, after the intelligent window is removed, the intelligent window may run in the background of the electronic device. When the electronic device detects that reminder information changes, or when the electronic device meets a display condition of the intelligent window, the electronic device may re-display the intelligent window.

S101: The electronic device displays the first user interface.

Specifically, the first user interface may be an interface on which a first application runs on the electronic device 100, or may be a home screen of the electronic device 100.

For example, the first user interface may be the user interface 310 provided in the embodiment of FIG. 3A. In addition to the foregoing user interface, in specific implementation, the first user interface may alternatively be another user interface. This is not limited in this application.

S102: When it is detected that a location of the electronic device is within the airport range, display the intelligent window on the first user interface, display airport arrival reminder information in the intelligent window, and stop displaying the intelligent window on the first user interface after the intelligent window is displayed for 5 seconds.

The embodiment of FIG. 3A is used as an example. The user is using the electronic device to watch a video, and a user interface displayed on the electronic device is an interface of a video application. When the user arrives at the airport range, the electronic device may display the intelligent window on the video interface, and display "View the boarding pass" and an airline application icon in the intelligent window, to prompt the user to view boarding pass information.

The airport arrival reminder information may be preset by the user, or may be a factory setting of the electronic device.

S103: When it is detected that time on the electronic device is within two hours before the boarding time, display the intelligent window on the first user interface, display boarding reminder information in the intelligent window, and stop displaying the intelligent window on the first user interface after the intelligent window is displayed for 20 seconds.

The embodiment of FIG. 3C is used as an example. The boarding reminder information is "Boarding started", "View the boarding passes", and an airline application icon. In specific implementation, the boarding reminder information may be other information. This is not limited in this application.

Alternatively, the electronic device may display the intelligent window including the boarding reminder information within one hour before the example boarding time, to prompt the user to board.

S104: Obtain gate information, display the intelligent window on the first user interface, and display the gate information in the intelligent window.

In the embodiment of FIG. 3D(1), FIG. 3D(2), and FIG. 3D(3), if the gate information is obtained when the user is watching a video, the gate information may be displayed on a current video interface. For example, the gate information may be "Gate 52K", an airline application icon, and "View the boarding pass". In specific implementation, the gate information may alternatively be other information. This is not limited in this application.

S105: When it is detected that the gate information changes, display updated gate information in the intelligent window.

In the embodiment of FIG. 3D(1), FIG. 3D(2), and FIG. 3D(3), the electronic device displays a video interface, "Gate 52K" is displayed in the intelligent window, and the electronic device obtains flight information at preset intervals. When the electronic device detects that "Gate 52K" is updated to "Gate 68K" in the obtained flight information, and the gate information in the intelligent window is updated to "Gate 68K".

S106: When it is detected that time on the electronic device is the airplane takeoff time, stop displaying the intelligent window on the first user interface, and no longer display flight information such as the gate on the first user interface.

The following specifically describes three manners of obtaining flight information.

(1) The electronic device obtains a permission for the airline application, and obtains flight information through an application programming interface API.

Specifically, when the electronic device is granted the permission for the airline application, the electronic device may directly call the API interface of the airline application to obtain related information of the airline application.

(2) The electronic device does not obtain a permission for the airline application, and pushes information through an application server.

When the electronic device does not obtain a permission for the airline application, the electronic device integrates a software development kit (SDK) of the airline application in an intelligent window module, and pushes flight information to the SDK through an airline cloud. The intelligent window module provides an API interface, and the SDK of the airline application calls the API interface of the intelligent window module to display the flight information in the intelligent window.

Figure 8:
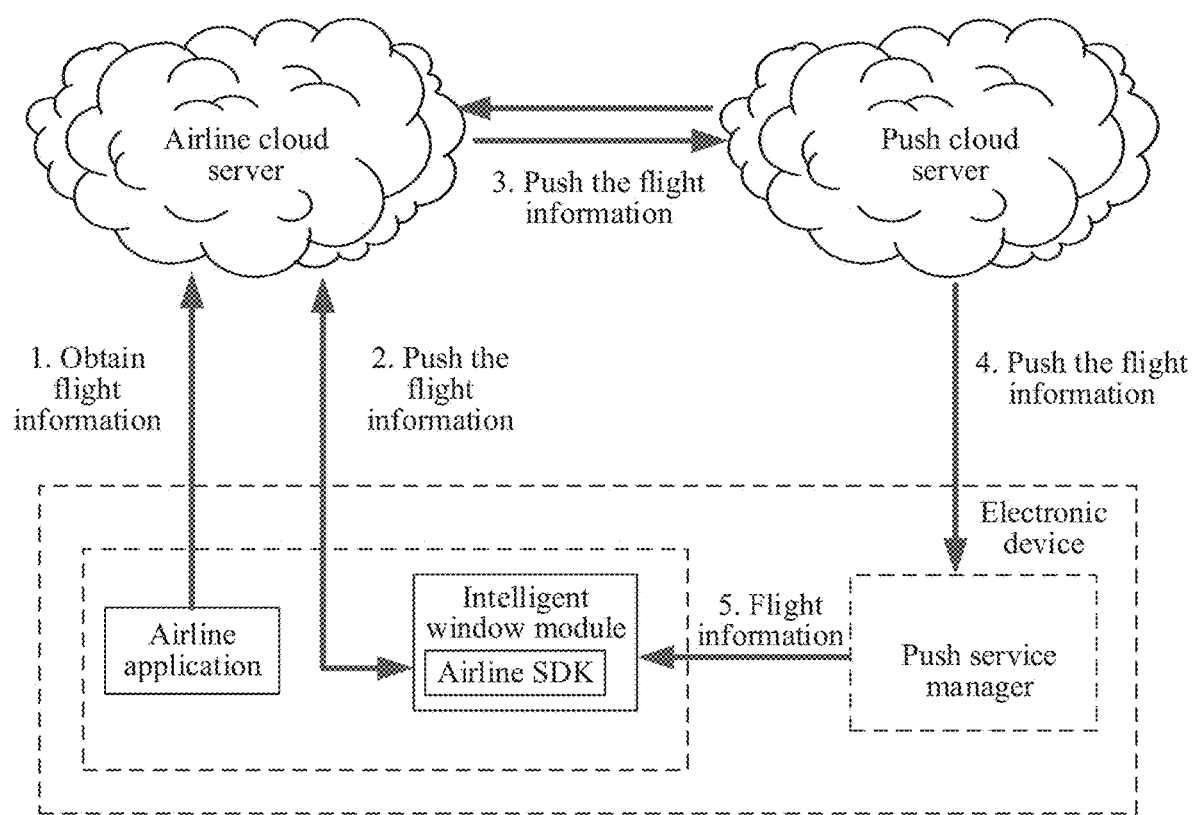
FIG. 8 is a schematic diagram of obtaining flight information according to an embodiment of this application.

For example, FIG. 8 is a schematic diagram of obtaining flight information.

An airline cloud server obtains flight information of the user in the airline application on the electronic device. The airline cloud server directly pushes the flight information of the user to the SDK of the airline application integrated in the intelligent window module. The SDK of the airline application calls the API interface of the intelligent window module to display the flight information in the intelligent window.

Alternatively, the airline cloud server obtains the flight information of the user in the airline application on the electronic device, the airline cloud server sends the flight information of the user to a push cloud server, and the push cloud server pushes the flight information to the electronic device. After the electronic device receives the flight information from the push cloud server, the flight information is stored in a push manager. When the intelligent window module of the electronic device detects that a location of the electronic device is within the airport range, the intelligent window module requests flight information from the push manager, the push manager sends the pushed flight information to the intelligent window module, and the intelligent window module displays the flight information in the intelligent window.

(3) An SMS message is obtained.

Specifically, after the user books a ticket, the electronic device receives flight information sent by the airline application, and the electronic device obtains flight information from an SMS application.

It should be noted that, for ease of description, the foregoing method embodiments are described as a series of combinations of actions. However, a person skilled in the art should be aware that the present disclosure is not limited to the described order of the actions. In addition, a person skilled in the art should also be aware that the embodiments described in this specification are all example embodiments, and the related actions are not necessarily required in the present disclosure.

Implementations of this application may be randomly combined, to achieve different technical effects.

An embodiment of this application further provides a computer-readable storage medium. All or some of the processes in the foregoing method embodiments may be completed by a computer program instructing related hardware. The program may be stored in the foregoing computer storage medium. When the program is executed, the processes in the foregoing method embodiments may be included. The computer-readable storage medium includes any medium that can store program code, such as a read-only memory (ROM), a random access memory (RAM), a magnetic disk, or an optical disc.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art can understand that all or some of the processes of the methods in the foregoing embodiments may be implemented by a computer program instructing related hardware. The program may be stored in a computer-readable storage medium. When the program is executed, the processes in the foregoing method embodiments may be included. The storage medium includes any medium that can store program code, such as a ROM, a RAM, a magnetic disk, or an optical disc.

In conclusion, the foregoing descriptions are merely embodiments of the technical solutions of the present disclosure, and are not intended to limit the protection scope of the present disclosure. Any modification, equivalent replacement, improvement, and the like made based on the disclosure of the present disclosure shall fall within the protection scope of the present disclosure.

What is claimed is:

1. An information display method, wherein the method comprises:
    displaying, by an electronic device, a first user interface, wherein the first user interface is an interface of a first application, or the first user interface is a home screen of the electronic device;
    based on the electronic device determining that a difference between a current moment and a boarding moment is within a preset reminder duration, displaying, by the electronic device, a display window on the first user interface, and displaying first flight information in the display window, wherein a size of the display window is less than ¼ of a size of a display area of the first user interface;
    determining, by the electronic device based on an importance of the first flight information, that a preset display duration of the display window is a first window display duration;
    obtaining, by the electronic device, second flight information within the first window display duration in which the display window is displayed, and alternately displaying the first flight information and the second flight information in the display window based on a preset period;
    determining, by the electronic device, an importance of the second flight information is higher than the importance of the first flight information, wherein the preset display duration of the display window is a second window display duration corresponding to the second flight information, and the second window display duration is greater than the first window display duration, and wherein during the preset period, the display window displays the second flight information for a longer period than the first flight information; and
    stopping, by the electronic device, displaying the display window after a duration for which the electronic device displays the display window reaches the preset display duration.

2. The method according to claim 1, wherein within one period of displaying the first flight information and the second flight information, a reminder display duration of displaying the second flight information is longer than a reminder display duration of displaying the first flight information.

3. The method according to claim 1, wherein within one period of displaying the second flight information and the first flight information, a reminder display duration of displaying the second flight information is equal to a reminder display duration of displaying the first flight information.

4. The method according to claim 1, wherein within one period of displaying the first flight information and the second flight information, the second flight information is displayed before the first flight information.

5. The method according to claim 1, wherein a time at which the second flight information is obtained is earlier than a time at which the first flight information is obtained, and within one period of displaying the first flight information and the second flight information, the second flight information is displayed before the first flight information.

6. The method according to claim 1, wherein the method further comprises:
    obtaining, by the electronic device, third flight information after stopping displaying the display window, wherein an importance of the third flight information is higher than the importance that of the first flight information and the importance of the second flight information;
    determining, by the electronic device based on the importance of the third flight information, that a display duration of the display window is a second window display duration, wherein the second window display duration is longer than the first window display duration; and
    stopping, by the electronic device, displaying the display window after a duration for which the electronic device displays the display window reaches the second window display duration.

7. An electronic device, comprising:
    a memory configured to store computer program code, wherein the computer program code comprises computer instructions; and
    one or more processors configured to invoke the computer instructions to enable the electronic device to perform operations comprising:
        displaying a first user interface on a display screen, wherein the first user interface is an interface of a first application, or the first user interface is a home screen of the electronic device;
        based on a difference between a current moment and a boarding moment being within a preset reminder duration, displaying a display window on the first user interface on the display screen, and displaying first flight information in the display window, wherein a size of the display window is less than ¼ of a size of a display area of the first user interface;
        determining, based on an importance of the first flight information, that a display duration of the display window is a first window display duration;
        obtaining second flight information within the first window display duration in which the display window is displayed on the display screen, and alternately displaying the first flight information and the second flight information in the display window based on a preset period; and
        stopping displaying the display window after duration for which the display window is displayed on the display screen reaches a preset display duration, wherein the preset display duration is a display duration of a window corresponding to flight information with higher importance among the first flight information and the second flight information.

8. The electronic device according to claim 7, wherein an importance of the second flight information is higher than an importance of the first flight information, and within one period of displaying the first flight information and the second flight information, a reminder display duration of displaying the second flight information is longer than a reminder display duration of displaying the first flight information.

9. The electronic device according to claim 7, wherein within one period of displaying the second flight information and the first flight information, a reminder display duration of displaying the second flight information is equal to a reminder display duration of displaying the first flight information.

10. The electronic device according to claim 7, wherein an importance of the second flight information is higher than an importance of the first flight information, and a time at which the second flight information is obtained is earlier than a time at which the first flight information is obtained, and wherein within one period of displaying the first flight information and the second flight information, the second flight information is displayed before the first flight information.

11. The electronic device according to claim 7, wherein the one or more processors are further configured to invoke the computer instructions to enable the electronic device to perform the following operations:
  obtaining third flight information after stopping displaying the display window, wherein an importance of the third flight information is higher than an importance of the first flight information and an importance of the second flight information;
  determining, based on the importance of the third flight information, that a display duration of the display window is a second window display duration, wherein the second window display duration is longer than the first window display duration; and
  stopping, by the electronic device, displaying the display window after a duration for which the display window is displayed on the display screen reaches the second window display duration.

12. An electronic device, comprising:
  a memory configured to store computer program code, wherein the computer program code comprises computer instructions; and
  one or more processors configured to invoke the computer instructions to enable the electronic device to perform operations comprising:
    displaying a first user interface on a display screen, wherein the first user interface is an interface of a first application, or the first user interface is a home screen of the electronic device;
    based on a first preset condition being met, displaying a display window on the first user interface, and displaying first reminder information in the display window on the display screen, wherein a size of the display window is less than ¼ of a size of a display area of the first user interface;
    determining, based on an importance of the first reminder information, that a display duration of the display window is a first window display duration;
    based on a second preset condition being met, alternately displaying, by the electronic device, the first reminder information and second reminder information in the display window based on a preset period within the first window display duration in which the display window is displayed on the display screen; and
    stopping displaying the display window after a duration for which the display window is displayed on the display screen reaches a preset display duration, wherein the preset display duration is a display duration of a window corresponding to reminder information with higher importance among the first reminder information and the second reminder information.

13. The electronic device according to claim 12, wherein an importance of the first reminder information is higher than an importance of the second reminder information, and within one period of displaying the first reminder information and the second reminder information, a reminder display duration of displaying the first reminder information is longer than a reminder display duration of displaying the second reminder information.

14. The electronic device according to claim 12, wherein an importance of the first reminder information is higher than, equal to, or lower than an importance of the second reminder information, and within one period of displaying the first reminder information and the second reminder information, a reminder display duration of displaying the first reminder information is equal to a reminder display duration of displaying the second reminder information.

15. The electronic device according to claim 12, wherein an importance of the first reminder information is higher than an importance of the second reminder information, and within one period of displaying the first reminder information and the second reminder information, the first reminder information is displayed before the second reminder information.

16. The electronic device according to claim 12, wherein an importance of the first reminder information is equal an importance of the second reminder information, wherein a time at which the first reminder information is obtained is earlier than a time at which the second reminder information is obtained, and wherein within one period of displaying the first reminder information and the second reminder information, the second reminder information is displayed before the first reminder information.

17. The electronic device according to claim 12, wherein the one or more processors are further configured to invoke the computer instructions to enable the electronic device to perform the following operations:
  after stopping displaying the display window on the display screen and based on determining that a third preset condition is met, displaying a display window on the first user interface on the display screen, and displaying third reminder information in the display window, wherein an importance of the third reminder information is higher than an importance of the first reminder information and an importance of the second reminder information;
  determining, based on the importance of the third reminder information, that display duration of the display window is a second window display duration, wherein the second window display duration is longer than the first window display duration; and
  stopping displaying the display window after a duration for which the display window is displayed on the display screen reaches the second window display duration.

* * * * *